United States Patent [19]
Oldenbourg et al.

[11] Patent Number: 5,521,705
[45] Date of Patent: May 28, 1996

[54] POLARIZED LIGHT MICROSCOPY

[76] Inventors: Rudolf Oldenbourg, 1006 County Rd., P.O. Box 459, Cataumet, Mass. 02534; Guang Mei, 162 E. Falmouth Hwy., Apt. 1, East Falmouth, Mass. 02536

[21] Appl. No.: 241,842

[22] Filed: May 12, 1994

[51] Int. Cl.$^6$ .................................................. G01N 21/21
[52] U.S. Cl. ........................................................... 356/368
[58] Field of Search ................................. 356/364, 365, 356/366, 367, 368, 369, 370, 33, 34, 35; 250/225

[56] References Cited

U.S. PATENT DOCUMENTS

| | | | |
|---|---|---|---|
| 3,741,661 | 6/1973 | Yamamoto et al. | 356/368 |
| 3,992,104 | 11/1976 | Watanabe | 356/368 |
| 4,523,848 | 6/1985 | Gorman et al. | 356/368 |
| 4,796,995 | 1/1989 | Salzman et al. | 356/368 |

*Primary Examiner*—Richard A. Rosenberger
*Attorney, Agent, or Firm*—Hale and Dorr

[57] ABSTRACT

A method for determining polarization properties of light from an object uses a detector for detecting the intensity of light incident thereon. A pair of variable retarders are positioned in the optical path with their slow optical axes at a 45° angle to each other, and a polarized light analyzer is also placed in the optical path between the light retarders and the detector. For each of the light retarders, a base retardance level is determined. The base retardance level is such that when each of the light retarders is set at the base retardance thereof and light from an object is circularly polarized, the light analyzer will cause substantial extinction of light from the object that traverses the analyzer and the intensity of light from the object incident on the detector will be substantially zero. Then, the retardance of the light retarders is set at a first retardance level in which the retardance of at least one of said retarders is different from the base retardance thereof and the intensity of light incident on said detector when said light retarders are set at the first retardance level is determined. This procedure is repeated with the retardance of the light retarders set at a second, and different retardance level. The polarization properties of the light is determined from the intensities measured at the different retardance levels.

13 Claims, 5 Drawing Sheets

POLARIZED LIGHT MICROSCOPY

FIELD OF INVENTION

This invention relates to polarized light and, more particularly, to a polarized light microscope for measuring polarization properties of light and submicroscopic specimen anisotropy.

BACKGROUND OF INVENTION

The polarized light microscope ("pol-scope") has the ability to measure submicroscopic molecular arrangements dynamically and non-destructively in living cells and other specimens. For this reason, it has been widely used in the field biological research, as set forth in the publications discussed below, which are incorporated herein by reference.

G. Valentin published the first observations on the appearance of parts of organisms between crossed nicols (Valentin, G. 1861. Die Untersuchung der Pflanzen- und der Thiergewebe in polarisiertem Lichte. Leipzig). The use of polarized light microscopy as applied to biology was marked by the numerous observations by W. J. Schmidt on the structure and development of skeletal and cellular components (Schmidt, W. J. 1924. Die Bausteine des Tierkorpers in polarisiertem tichte. Cohen, Bonn.; Schmidt, W. J. 1937. Die Doppelbrechung von Karyoplasma, Ztoplasma und Metaplasma. Borntrager, Berlin). Schmidt inferred the orientation of lipid molecules in membranes from observations in the polarized light microscope, before it was confirmed by X-ray diffraction. By carefully analyzing and eliminating sources of stray light in the polarizing microscope, Swann and Mitchison improved the sensitivity of the instrument considerably. (Swann M. M. and J. M. Mitchison. 1950. Refinements in polarized light microscopy. J. Exp. Biol. 27:226–237) and Inoue (Studies on depolarization of light at microscope lens surfaces. I. The origin of stray light by rotation at the lens surfaces. *Exp. Cell Res.* 3:199–208 ). With the improved sensitivity Inoue demonstrated the existence of fibers in the mitotic spindle directly in living cells (Inoue, Polarization optical studies of the mitotic spondile. I. The demonstration of spindle fibers in living cells. *Chromosoma* 5:487–500).

The introduction of the polarization rectifier increased the sensitivity further by a factor of 10 (Inoue, S. and W. L. Hyde. 1957. Studies on depolarization of light at microscope lens surfaces II. The simultaneous realization of high resolution and high sensitivity with the polarizing microscope. *J. Biophys. Biochem. Cytol.* 3:831–838), and led to a landmark study of DNA arrangement in living sperm (Inoue, S. and H. Sato. 1966. Deoxyribonucleic add arrangement in living sperm. In Molecular architecture in cell physiology. T. Nayashi and A. G. SzentGyorgyi, Editor. Prentice Hall, Englewood Cliffs, N.J. 209–248). However, it took Inoue and Sato three man-years to collect and analyze the data taken from three individual sperms with the high resolution, linear polarized light microscope.

Many of the pioneering studies in polarizing microscopy were associated with special instrumental developments to observe ever finer structural details and measure more rapidly specimen birefringence occurring in e.g. cytoplasmic flow or during rigor to relax transition in vertebrate striated muscle (Taylor, D. L. 1976. Quantitative studies on the polarization optical properties of striated muscle I. Birefringence changes of rabbit psoas muscle in the transition from rigor to relaxes state. *J. Cell Biol.* 68:497–511).

Early automated detection schemes measured the magnitude of specimen birefringence in a single point (spot size 1.3 Micrometer diameter or larger, characteristic time constant $1/10$ ms or longer) with an excellent sensitivity of a fraction of an Angstrom of specimen retardance. (Takasaki, H. 1961. Photoelectric measurement of polarized light by means of an ADP polarization modulator. I. Photoelectric Polarimeter, II. Photoelectric elliptic polarimeter. *J. Opt. Soc. Am.* 51:462–463) (Takasaki, H. 1961. Photoelectric measurement of polarized light by means of an ADP polarization modulator. III. Measurement of linear birefringence, IV. Lens interferometer. *J. Opt. Soc. Am.* 51:1146–1147); (Allen, R. D., J. Brault and R. D. Moore. 1963. A new method of polarization microscopic analysis I. Scanning with a birefringence detection system. *J. Cell Biol.* 18:223–235); (Taylor, D. L. and R M. Zeh. 1976. Methods for the measurement of polarization optical properties I. Birefringence. *J. Microsc.* 108:251–259); (Hiramoto, Y., Y. Hamaguchi, Y. Shoji and S. Shimod. 1981. Quantitative studies on the polarization optical properties of living cells I. Microphotometric birefringence detection system. *J. Cell Biol.* 89:115–120) However, the low spatial resolution, especially the restriction to a single point or area, and the fixed orientation of the measured birefringence limited the use of these detectors.

The restriction of the measurement of optical anisotropy to a single specimen point was overcome by Tinoco and collaborators in a structural study of spermatocyte nuclei, by introducing a scanning stage in their differential polarization microscope (Mickols, W., M. F. Maestre and I. Tinoco Jr. 1987. Differential polarization microscopy of changes in structure in spermatocyte nuclei. *Nature* 328:452–454; Oldenbourg, R. 1991. Analysis of edge birefringence. *Biophys. J.* accepted for publication). The optical path in this instrument is similar to a transmission, stage scanning confocal microscope. While the spatial resolution and sensitivity is high, the time required to obtain a complete image is about 45 minutes.

The use of video cameras to record images of birefringent specimens with the polarized light microscope was first introduced by Allen and collaborators (Allen, R. D., J. L. Travis, N. S. Allen and Ho Yilmaz. 1981. Video-enhanced contrast polarization (AVEC-POL) microscopy: A new method applied to the detection of birefringence in the motile reticulopodial network *Allogromia laticollaris. Cell Motil.* 1:275–289) and by Inoue (1981. Video image processing greatly enhances contrast, quality and speed in polarization-based microscopy. *J. Cell Biol.* 89:346–356). To measure specimen birefringences from recorded images one can use a predetermined calibration curve to relate measured intensities to specimen birefringences in different parts of the image (Schaap, C. J. and A. Forer. 1984. Video digitizer analysis of birefringence along the length of single chromosomal spindle fibres I. Description of the system and general results.]. *Cell Sci.* 65:21–40). This method is relatively fast, but subject to errors from variations in light intensities that stem from other sources than birefringence, e.g. light scattering or shading. In a study on edge birefringence, Oldenbourg recorded images of a given specimen at several different compensator settings and used the stack of images to compute the specimen birefringences independent of the overall intensity and the background light in different parts of the viewing field. Oldenbourg, R. 1991. Analysis of edge birefringence. *Biophys. J. Vol.* 60 page 629.

With the traditional pol-scope, thus, single images display only those anisotropic structures that have a limited range of orientations with respect to the polarization axes of the microscope. Furthermore, rapid measurements are restricted to a single image point or single area that exhibits uniform birefringence or other form of optical anisotropy, while measurements comparing several image points take an inordinately long time.

There remains a need for a pol-scope that will permit data collection and determination of anisotropic structures (e.g., specimen birefringence) irrespective of orientation and over a wide range of magnitude, and that will do so in a short period of time.

SUMMARY OF INVENTION

The present invention provides for rapid and simultaneous determination of polarization characteristics, e.g., ellipticity and orientation of refractive index ellipses and differential absorbance or reflectivity, in the examination or measurement of structural anisotropies such as birefringence, dichroism and polarized fluorescence. The polarized light microscope ("pol-scope") of the present invention employs nearly circularly polarized light and a pair of electro-optical modulators whose reference axes are rotated at 45 degrees to each other. A video camera and computer-assisted image analysis system provide fast, and essentially simultaneous, measurements of specimen anisotropy (e.g., retardance magnitude and azimuth) at all points of the image constituting the field of view.

The present invention can be implemented in different, but closely related ways to determine polarization optical parameters (e.g., birefringence, dichroism, differential reflectivity, polarized fluorescence) of materials as diverse as planetary surfaces in remote sensing, thin films in ellipsometry, geological samples in mineral explorations, metallurgical, plastic, glass, ceramic and crystalline materials in manufacturing and processing control, and biological cell and tissue sample in basic research and clinical applications.

The measurement process of the invention as presently implemented results in particularly clear images free of shading and background light over the entire viewing field. The images and measurements document fine structural and molecular organization within a thin optical section of the specimen. The high spatial and temporal resolution of the new pol-scope, together with its ease of use for obtaining quantitative specimen records concurrently for the whole field of view, allows new investigations into the dynamics of macromolecular organization of living cells and other systems.

The system of the present invention has the ability to display sequentially the spatial distribution, and rapidly measure the temporal changes in: birefringence due to intra-molecular anisotropy or fine-structural form, and (with some modification to the basic scheme) polarized fluorescence in molecular moiety selectively labeled with reporter dyes, and dichroism exhibited by naturally occurring chromophores. Biological mechanisms and macromolecular phenomena that can be explored taking advantage of these unique capabilities of the invention include:

* Regulated assembly and disassembly of microtubules, actin filaments, and other cytoskeletal elements and their role in organelle transport, cell division, cell differentiation.
* Functional role and organization of DNA tertiary structure as displayed in decondensing sperm head, polytene chromosomes and chromatin of lower eukaryotes.
* Conformational and micro-environmental changes associated with motility and transport functions in myosin, dynein, membrane proteins.
* Turnover and functional changes of stacked membrane structures such as in retinal rods and cones, chloroplasts, Golgi bodies.
* Spontaneous and induced generation of ordered domains in liquid crystals, polymer solutions and lipid layers, and their Brownian, cyclic, and propagatod fluctuations.

DRAWINGS

FIGS. 1–3 schematically illustrate polarizing microscopes embodying the present invention.

DESCRIPTION OF PREFERRED EMBODIMENTS

Figure 1:
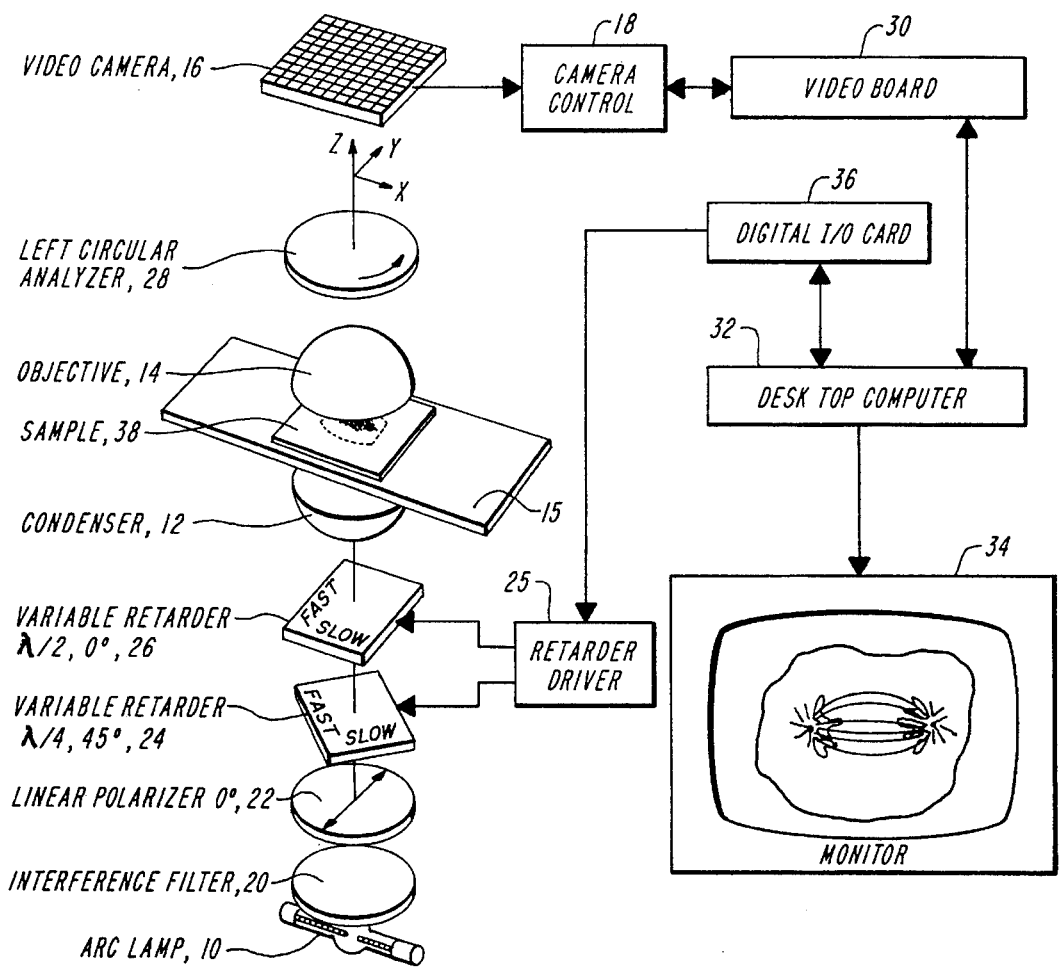

FIG. 1 illustrates the system of the present invention as built-up in a Nikon Microphot-SA optical microscope stand. As is conventional, the microscope itself includes a mercury arc lamp 10, and a condenser lens 12 and an objective lens 14 (e.g., a 60×1.4-NA Plan APO objective lens) on opposite sides of a sample stage 15. The light from a sample on the sample stage is directed to a CCD video camera 16 with camera controller 18 (Dage-MTI model CCD-C72).

According to this embodiment of the present invention, the light path between the mercury arc lamp 10 and video camera 16 also includes, on the illumination side of the condenser lens 12, an interference filter 20, a linear polarizer 22 (mounted with its axis at 0° to a reference axis), and a pair of variable, liquid crystal, electro-optical retarders 24, 26 with their principal slow axes positioned, respectively, at 45° and 0° to the reference axis. In the optical path on the imaging side of the sample stage 15 and objective lens 14, i.e., between the objective lens and the video camera 16, is a left circular analyzer 28. In the disclosed preferred embodiments, the variable retarders/electro-optic modulators are liquid crystal devices (e.g., obtained from Cambridge Research and Instrumentation, Inc. of Cambridge, Mass.). In other embodiments, other variable retarders/electro-optic modulators, such as Pockels cells, may also be used. Similarly, other light sources, e.g., incandescent lamps or lasers, may be used in place of mercury vapor lamps; monochromoters or the like may be used in lieu of an interference filter; and a general purpose two-dimensional detector maybe used in lieu of the CCD video camera and associated optics of the preferred embodiments.

It will be appreciated that linear polarizer 22 and circular analyzer 28 are located in the same positions in the optical path as are the polarizer and analyzer in a traditional microscope, but that in traditional microscopes a linear analyzer is conventionally used and a sample on sample stage 15 is illuminated with linearly polarized light. Circular polarizers are usually fabricated as a stack of a linear polarizer followed by a quarter wave plate.

It will also be appreciated that, in the illustrated embodiment, the two variable retarders 24, 22 are located in the illumination path between circular polarizer 22 and the condenser lens 12. In other embodiments, the variable retarders may be placed in the imaging path (as shown in FIG. 2), or on opposite sides of the specimen stage 15 (as shown in FIG. 3) instead of entirely in the illuminating path.

Figure 2:
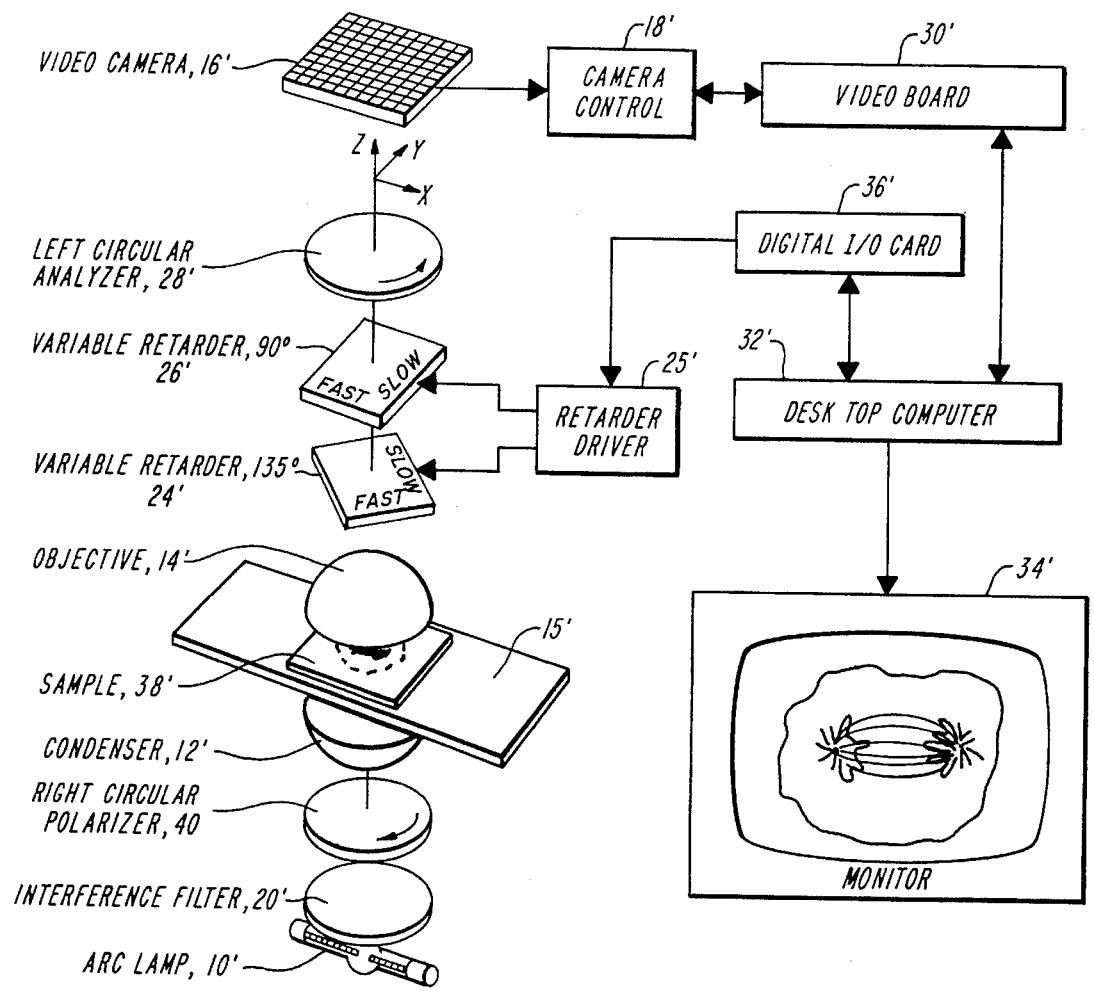
Figure 3:
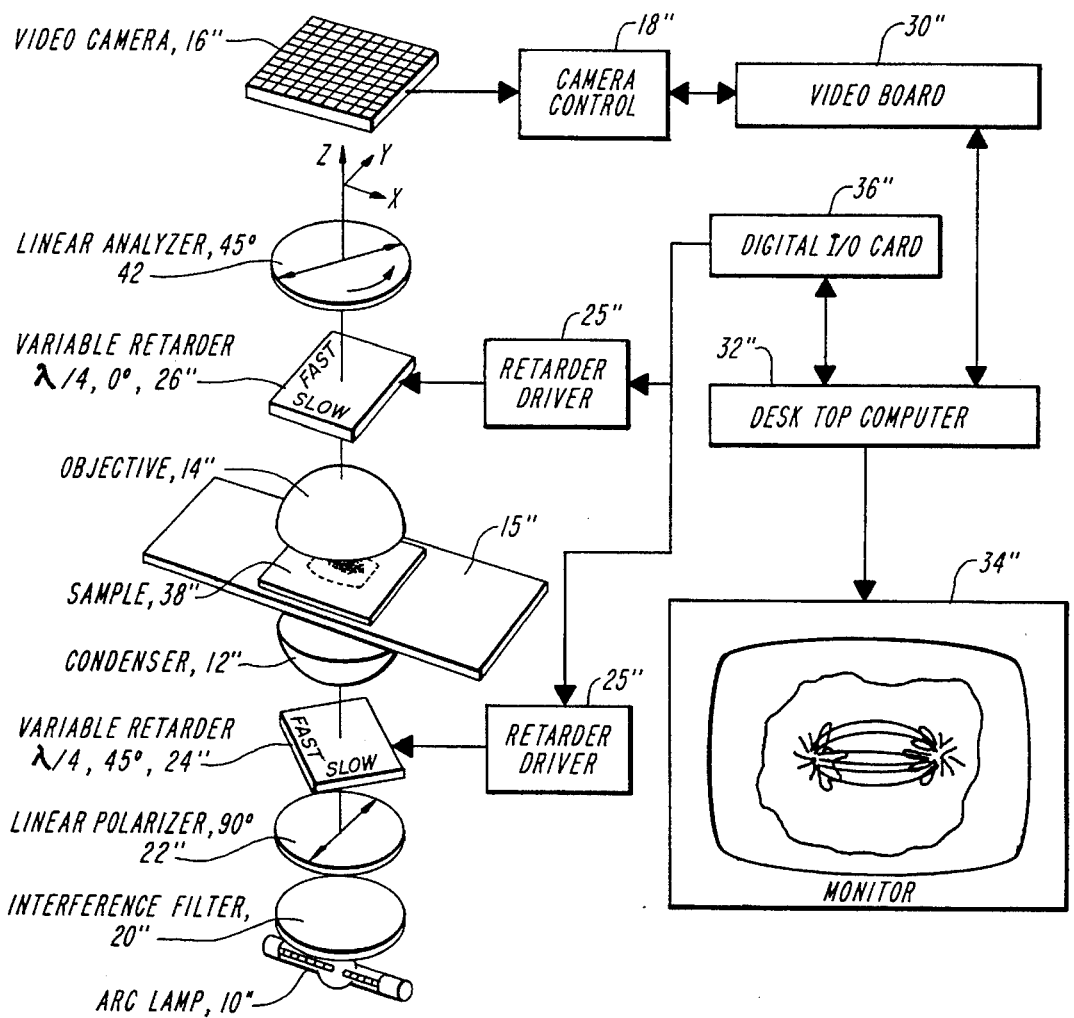

It will also be appreciated that the embodiments disclosed in FIGS. 1–3 herein employ transmission microscopes in which the illuminating and imaging paths are on opposite sides of the specimen stage. The present invention may also employed in epi-illumination microscopes for measurement of reflective samples. In such epi-illumination microscopes, a single objective lens serves both as a condensor to illuminate the specimen and as an objective to collect the back-scattered light from the speciment and project an image on the video cameras. In these embodiments, a beam splitter, known to be specially designed for reflective polarized light microscopes to minimize polarization abberations, is placed on the side of the objective away from the specimen (i.e., the objecive lens is between the beam splitter and the specimen) to separate the illumination path from the imaging path.

As illustrated in connection with the transmission microscope systems of FIGS. 1–3, a pair of variable retarders, a polarizing analyzer, and (depending on the particular embodiment) one or more other polarizing elements, are placed in the illumination and imaging paths. Retarders, analyzers and other polarizing elements of equivalent type are positioned in equivalent positions in the illumination and imaging paths of reflective polarized light microscope systems. Further, the operation of epi-illumination microscope systems embodying the present invention is essentially the same as described hereinafter with respect to the embodiments of FIGS. 1–3 which employ transmission-type microscopes to measure polarized light and specimen optical properties.

In all of the disclosed embodiments, each retarder/electro-optic modulator retards, and thus affects the polarization state of light passing through it. The extent to which the polarization state of the light passing through a particular retarder is changed, in both ellipticity and azimuth, can be controlled by varying the voltage applied to the retarder. In the illustrated embodiments, the two retarders are set with their slow axes at 45° to each other; and the pair of retarders together is able to change any elliptically polarized light into any other elliptical polarization (including linear and circular) by changing the retardance levels of individual retarders to appropriate values.

Both liquid crystal and Pockel cell retarders are commercially available in precision quality and suitable for imaging purposes. Liquid crystal retarders are made from nematic liquid crystals between optically flat, fused silica substrates with transparent front electrodes suitable for applying a voltage across the liquid crystal material. With a moderate voltage between 0 and 40 V, the liquid crystal reorients and the retardance of the assembly changes in the range from e.g., 1100 nm to 100 nm. With a fixed retarder added in the subtractive position the useful retardance range can be changed to e.g. −500 . . . +500 nm. The typical response time is 40 ms, which is close to the time period of one video frame. Pockels cells, which are made from thin, Z-cut KD*P crystals, have a much faster response time of 1 microsecond. Their retardance is controlled in the desired range by a high voltage between −1000 V and +1000 V. In Pockels cells, the retardance changes linearly with voltage.

In the embodiment of FIG. 1, light produced by the mercury arc lamp 10 is first filtered, and a narrow wave band (e.g., 546 mm) is selected and passed, by filter 10. Liquid crystal variable retarders 24, 26 are initially set (i.e., by selection of the voltage applied to each by retarder drive 25) so that retarder 24 acts as a quarter wave ($\lambda/4$) plate and retarder 26 acts as a half wave ($\lambda/2$) plate.

As will be seen, the monochromatic light from filter 20 is linearly polarized. When set as a quarter wave plate, variable retarder 24 causes the linearly polarized light passed through it to become left circularly polarized. When set as a half wave plate, variable retarder 26 causes the left circularly polarized light passed through it to become right circularly polarized. The right circularly polarized light from retarders 26 illuminates a specimen 38 on stage 15, and the light traversing any region of a specimen will be rendered elliptically polarized by any linear birefringence or dichroism of the specimen region traversed. Thus, the image formed by objective lens 14 (assuring specimen birefringence or similar anisotropy) will contain elliptically polarized light. The amount of light from each specimen region that passes through left circular analyzer 28, and the intensity of the light that falls on each detector of the CCD detector array of video camera 16, depends on the extent of ellipticity of the light.

The images produced by the light incident on the detectors of the CCD detector array of video camera 16 are recorded at a regular rate, e.g., 30 frames a second. Between frames, the voltages applied to retarders 24, 26 may be changed, thus causing changes in the ellipticity of the light incident on the specimen and in the intensity of the light incident on the detector array of camera 16.

If, as in this embodiment, liquid crystal devices are employed as retarders, at least two frame periods are required per measurement, one for the retarders to settle to the new retardance values and one frame to record the intensities. For good time resolution, the camera 16 should have a high sensitivity and low read-out noise, to reduce the noise of a single frame, and very little lag, to minimize the influence of the reading of one frame on the next. Also, high linearity is desirable between output voltage and light intensity falling on the face plate of the camera. These requirements can be met by a CCD camera such as that described earlier.

The detector array of camera 16 is connected to camera control 18 for read out, and for setting camera parameters such as gain and black level. The images from the camera's detector array are transferred to a video board 30 (e.g., a Scion LC-3 video board with 8 bit resolution) using the conventional RS-170 video standard. In video board 30, the signal is digitized and, converted to a two-dimensional array of integer values representing the intensities in one frame. Array elements (or pixels) are each 8 bit (=1 byte) long to encode intensity values between 0 and 255. Each frame may include as many pixels as there are detector elements in the camera detector array, e.g., 680×480 pixels. Data from fewer detector elements may be processed if desired, principally to increase the speed of operation. If, for example, the number of detector elements from which data is taken is such that one frame includes about 520×480 pixels, about 0.25 Mbyte of memory space is required per frame.

From the video board, the data is passed to a desktop computer 32 (e.g., a Macintosh IIx or Quadra 800 computer). The data can then be displayed on monitor 34, and stored in computer memory and/or on a hard or floppy disk. A digital input/output (I/O) card 36 is connected to the desktop computer 32 to control the retarder driver 25. The retarder driver produces the necessary voltages required to set the retarders to desired retardance values.

The optical arrangement shown in FIG. 1 is sensitive to the magnitude of the birefringence of specimen 38, and to the orientation of the fast and slow axes of the specimen. Hence the images recorded by camera 16 will reflect the distribution of specimen retardance/birefringence (i.e., the birefringence in the portion of the specimen corresponding to each detector of the camera CCD array) in magnitude and orientation. It will, of course, be recognized that birefringence and retardance are related, and the two terms are often used interchangeably. Birefringence Δn) is an optical property of a specimen, and retardance (R) characterizes the change in polarization of light passing through the specimen. The two are related by:

R=(Δn)d when d is the specimen thickness.

FIGS. 2 and 3 illustrate two other embodiments of the invention. As will be seen, each of the systems employs a pair of variable retarders/electro-optic modulators in the optical path, but the arrangement of the retarders, and the selection and arrangement of some of the other elements in the optical paths, differ. In FIGS. 2 and 3, elements that correspond to elements of the embodiment of FIG. 1 are identified using the same reference number, with a differentiating prime (') or double prime (") added.

In the system of FIG. 2, variable retarders 24' and 26' are mounted between objective lens 14' and left circular analyzer 28' on the imaging side of specimen 38', rather than on the illuminating side of the specimen as in FIG. 1. Also, in the FIG. 2 embodiment, the only polarizing element between the interference filter 20' and condenser lens 12' is a right circular polarizer 40. In the FIG. 2 system, the variable retarders 24', 26' are again oriented with their principle slow axes oriented at 45° to each other, but in this embodiment the two axes are at 135° and 90°, respectively, to the reference axis. In the FIG. 2 embodiment, the initial settings of both retarders (e.g., the retardances resulting from the initial voltage levels applied to each of retarders 24', 26') have near-zero retardance; rather than the initial voltage and settings being such that the retarders operate at near half-wavelength and quarter-wavelength retardance levels as in the embodiment of FIG. 1. In the general arrangement of FIG. 2, it is also possible to replace circular analyzer 28' with a linear analyzer of appropriate orientation, in which event variable retarders 24' and 26' can be set to near half-wavelength and quarter-wavelength retardance levels to achieve extinction as in the embodiment of FIG. 1.

The embodiment of FIG. 3 includes a pair of variable electro-optic retarders 24", 26" positioned with their slow axes at 45° to each other and at 45° and 0° respectively to the reference axis. One of the retarders is mounted in the illuminating path, between linear polarizer 22" and condenser lens 12"; the other is in the imaging path on the other side of specimen 38", between objective lens 14" and linear analyzer 42. At their initial settings, both retarders act as quarter wave plates. Linear polarizer 22" is positioned with its main axis at 90° to the reference axis; the axis of linear analyzer 42 is at 45° to the reference axis. The system of FIG. 3 does not include any fixed wave plate in its optical path, and thus can be used to measure optical parameters at different wave lengths simply changing interference filter 20" so that it produces monochromatic light of the desired wavelength, and adjusting the linear retarders to provide quarter wavelength retardance at the selected wavelength.

It will be seen that, in all three disclosed embodiments, the light incident on and illuminating the samples 38, 38', 38" will be circularly polarized when the variable retarders are at their initial settings, and will be elliptically polarized if a slightly different voltage is applied to the retarders so that they provide a retardence somewhat different (e.g., slightly more or slightly less) than that produced at the initial settings. It will also be seen that, in each embodiment, the analyzer 28, 28', 42" on the imaging side of the specimen 38, 38', 38" is chosen such that no light will pass through it if the variable retarders are at their initial settings and any specimen in the optical path has zero retardance. Additionally, in each embodiment the variable retarders are positioned with their slow axes mutually oriented at 45° to each other, and that the retardances of the two can be varied independently depending on the voltage applied by the retarder drive.

This present invention permits the retardance (magnitude and azimuth) introduced by the specimen, regardless of orientation, to be compensated for by varying a specific voltage applied to one or both of the variable retarders. For any given linear specimen retardance or birefringence, there is a unique setting (and retardance value) of each of the variable retarders will cause the intensity of the beam passed through the output analyzer 28, 28', 42 to be at a minimum, or at extinction. These two retardance values (one for each of the variable retarders) can be obtained without rotating either retarder, any polarizer, or the specimen. Instead, only the voltages applied to the variable retarders are adjusted until minimum intensity or extinction is reached.

With the system of the present invention, it is also possible to determine the orientation and magnitude of specimen retardance without having to determine variable retardance settings that result in minimum intensity (or extinction) fo the light passing through analyzer 28, 28', 42. This capability is particularly important when the retardance of a specimen is not uniform over the entire viewing field.

Thus, according to the preferred practice of the present invention, the intensity of the light passing analyzer 28, 28'42 is measured at a plurality of predetermined settings of the variable retarders. Typically, four intensity measurements are made. When the retardance of the specimen is relatively large, i.e. is more than about the wavelength of the light, two sets of images (each including four images) are taken, one set using light of one wavelength and the other with a different wavelength light, and the same four variable retarder settings are used for each set of images. The retardance (magnitude and/or orientation) of the specimen is determined based on the measured (typically four) light intensities, and the known retardance values of the variable retarders corresponding to each intensity measurement.

The following description describes the four-image procedure typically used in determining specimen birefringence of less than about the wavelength of the illuminating light, and particularly the manner in which the magnitude and azimuth of the birefringence or retardance are determined when the birefringence is not more than about 1/25 of the wavelength, in the preferred embodiment not more than about 20 nanometers. The described procedure is essentially repeated when the birefringence is large and a second set of images is taken with a larger wavelength light.

In the preferred practice of the invention, one light intensity image is taken with the variable retarders at their initial settings, and the three other intensity images are taken with the retarders at different, predetermined and mutually independent retarder settings. The differences in retardance between the initial setting and the other predetermined settings are typically chosen to be larger than, or about the same magnitude as, the maximum retardance expected to be measured in the specimen.

For each region of the specimen in the field of camera view (e.g., for each region light from which is incident on a detector of the detector array, or for each region corresponding to a pixel of the display), the specimen region anisotropy is produced and displayed (or otherwise recorded or output) based on the intensity of the four images corresponding to that region.

Typically, the analysis of data from the four images produces two outputs, one representing the magnitude of the specimen retardance and the other of its orientation (i.e., the orientation of the slow axes). The image displayed on computer monitor 34, 34', 34" shows the data for each pixel in the field of view. The two complete images, typically 680×480 pixels, can be displayed separately, or they can be combined to show both retardance and orientation in each pixel.

Figure 4:
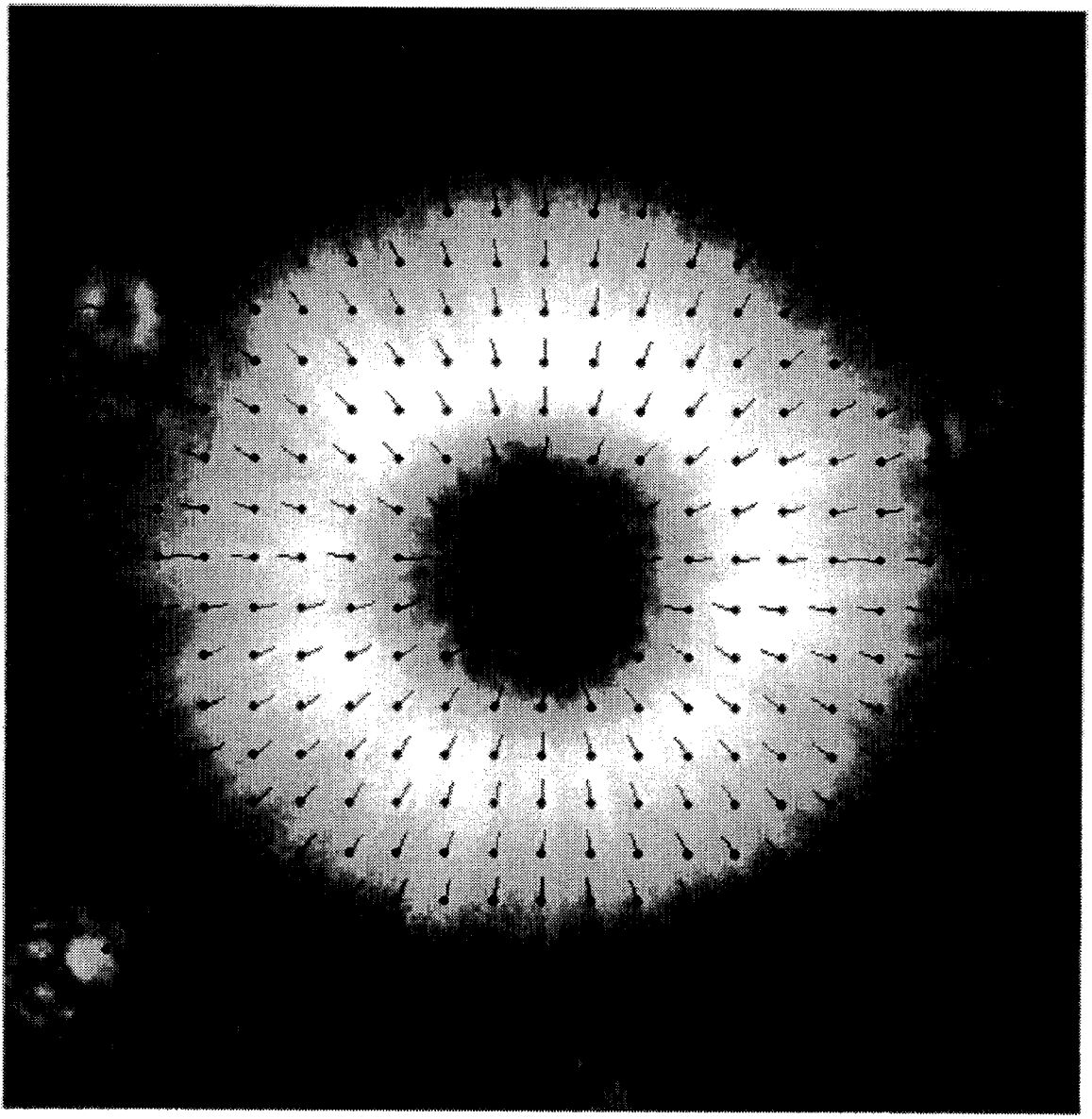
FIG. 4 illustrates a display of birefringence obtained using the present invention.

FIG. 4 shows the retardance magnitude and orientation of an aster prepared from clam oocytes. The magnitude of the retardance is represented by the gray scale, and ranges between 0 (black) and 3.2 (white) nanometers. The orientation (0° to 180°) of the retardance in the region corresponding to each pixel is indicated by the black lines which point (from the reference circle at one end of the line) in the direction of the azimuth. In FIG. 4, the azimuths are displayed on regular grid points, at a much lower resolution than that which the detectors at camera 16 would permit, to reduce the complexity of the display. The camera data permits a display of 680×480 image points, and has a sensitivity of 0.4 nanometers of specimen retardance. The display of FIG. 4 is an array of 256×240 pixels.

The display of FIG. 4 was enabled by the discovery that a simple and definite relationship exists between retardances of the two variable retarders and the orientation ($\rho$, measured in degrees) and magnitude (R, measured in nanometers) of specimen retardance. In instances in which the specimen retardance is less than about 1/25 of the wavelength of the light, the relationship, with only a small degree of error, can be expressed as:

$$R = \sqrt{\alpha_{min}^2 + \beta_{min}^2} \quad (1)$$

and $$\rho = \frac{\arctan\left(\frac{\alpha_{min}}{\beta_{min}}\right)}{2} - 45\ \text{sign}(\beta_{min}) + 90 \quad (2)$$

where $\alpha m_{in}$ and $\beta_{min}$ are the differences between retardances of the two variable retarders at which minimum intensity is obtained, and the initial values of the variable retarders.

As indicated above, the values of $\alpha_{min}$ and $\beta_{min}$ can be obtained directly, by employing a feedback loop and adjusting the voltages applied to the variable retarders until minimum intensity (or extinction) is obtained. If the specimen birefringence/retardance is small (e.g., in the illustrated embodiments is less than about $20_{nm}$) the values of $\alpha_{min}$ and $\beta_{min}$ may be obtained from the relationship:

$$I_i = I_o[(\alpha_i - \alpha_{min})^2 + (\beta_i - \beta_{min})^2] + I_{min} \quad (3)$$

where $I_i$ is the measured intensity, $I_o$ is the total intensity measured with compensation settings that result in maximum transmission and $I_{min}$ is the background intensity detected even at perfect compensation. The remaining terms of the relationship, $\alpha_i$ and $\beta_i$, are the offsets introduced into the variable retarders.

Three of the terms in the relationship, $I_i$, $\alpha_i$ and $\beta_i$ are known; four terms, $I_o$, $I_{min}$, $\alpha_{min}$ and $\beta_{min}$, are not. The four unknowns can be determined when measuring the intensity $I_i$ for four different retardances (e.g., $\alpha_i$, $\beta_i$) settings. Typically, the retardances are chosen so that each of $\alpha_i$ and $\beta_i$ are either O, X, or –X; X being a retardance between 0 and about 20 nm, and in most work to-date preferably about 16 nm; and the intensity is measured at:

($\alpha_1$=O; $\beta_1$=O) ($\alpha_2$=X, $\beta_2$=O) ($\alpha_3$=O, $\beta_3$=X), ($\alpha_4$=O; $\beta_4$=–X).

The values of $\alpha m_{in}$, $\beta_{min}$ required to determine specimen retardance and azimuth are then found based on the four measured intensities $I_1$, $I_2$, $I_3$, $I_4$ as follows:

$$\alpha_{min} = \frac{2I_2 - I_3 - I_4}{4I_1 - 2I_3 - 2I_4} X \quad (4)$$

and $$\beta_{min} = \frac{I_3 - I_4}{4I_1 - 2I_3 - 2I_4} X \quad (5)$$

It will be noted that the denominators of the two expressions (4) and (5) are the same, and that $\alpha_{min}$ and $\beta_{min}$ are independent of both $I_o$ and $I_i$. The thus determined values of $\alpha_{min}$ and $\beta_{min}$ may be used in expressions (1) and (2) to determine specimen retardance magnitude R and orientation $\rho$. Alternatively, $\alpha_{min}$ and $\beta_{min}$ in expressions (1) and (2) may be replaced by the right side of expressions (4) and (5) and R and $\rho$ may be determined directly from the measured intensities:

$$R = \frac{\sqrt{(2I_2 - I_3 - I_4)^2 + (I_3 - I_4)^2}}{4I_1 - 2I_3 - 2I_4} X \quad (6)$$

$$\rho = \frac{\arctan\left(\frac{2I_2 - I_3 - I_4}{I_3 - I_4}\right)}{2} - \quad (7)$$

$$45\ \text{sign}\left(\frac{I_3 - I_4}{4I_1 - 2I_3 - 2I_4}\right) + 90$$

The CCD array of camera 16 measures the intensity of light incident on each detector, i.e., for the region of the specimen corresponding to each detector element in the array. Equations (6) and (7) allow determination of the specimen retardance and azimuth for each such region of the specimen using the four intensity values measured. The intensity values are stored in four frame buffers of the video card or in computer memory. The actual computation of specimen retardances for each picture element with expressions (6) and (7) can be accomplished by using either specialized digital hardware, or specialized software controlling general purpose computer hardware. The first approach requires one or more computer boards providing several frame buffers, e.g., look up tables (INVERSE . . . ) and arithmetic functions (ADD, . . . ) or equivalent hardware, to compute the resultant images R and from the initial images $I_1$, $I_2$, $I_3$ and $I_4$. The second approach, which in general is slower than the hardware implementation but more flexible, requires specialized software, such as the NIH Image program described below and the program of Appendix A.

When the magnitude of the specimen birefringence and retardance is more than about 1/25 of the wavelength, the results provided by the particular relationships set forth above may not be sufficiently accurate for many scientific purposes, and the relationships between specimen retardance and that of the variable retarders will be better expressed by other equations.

System accuracy can also be increased by compensating for background effects. This is accomplished by taking a set of four intensity measurements with no specimen present, determining the background values of $\alpha_{min-b}$ and $\beta_{min-b}$ in the absence of a specimen, and then correcting the values of $\alpha_{min}$ and $\beta_{min}$ determined from the four intensity measurements by substracting the background values from them, i.e.:

$$\alpha_{min-c} = \alpha_{min-m} - \alpha_{min-b}$$

and $$\beta_{min-c} = \beta_{min-m} - \beta_{min-b}$$

where subscripts "–b" represent background measurements, and subscripts "–m" represent measurements taken with the specimen in position, and "–c" are the corrected values. These corrected values may then be substituted for $\alpha_{min}$ and $\beta_{min}$ in relationships (1), (2), (4), and (5) and corrected values of the magnitude and orientation of the specimen retardance obtained from corrected relationships (1) and (2).

Figure 5:
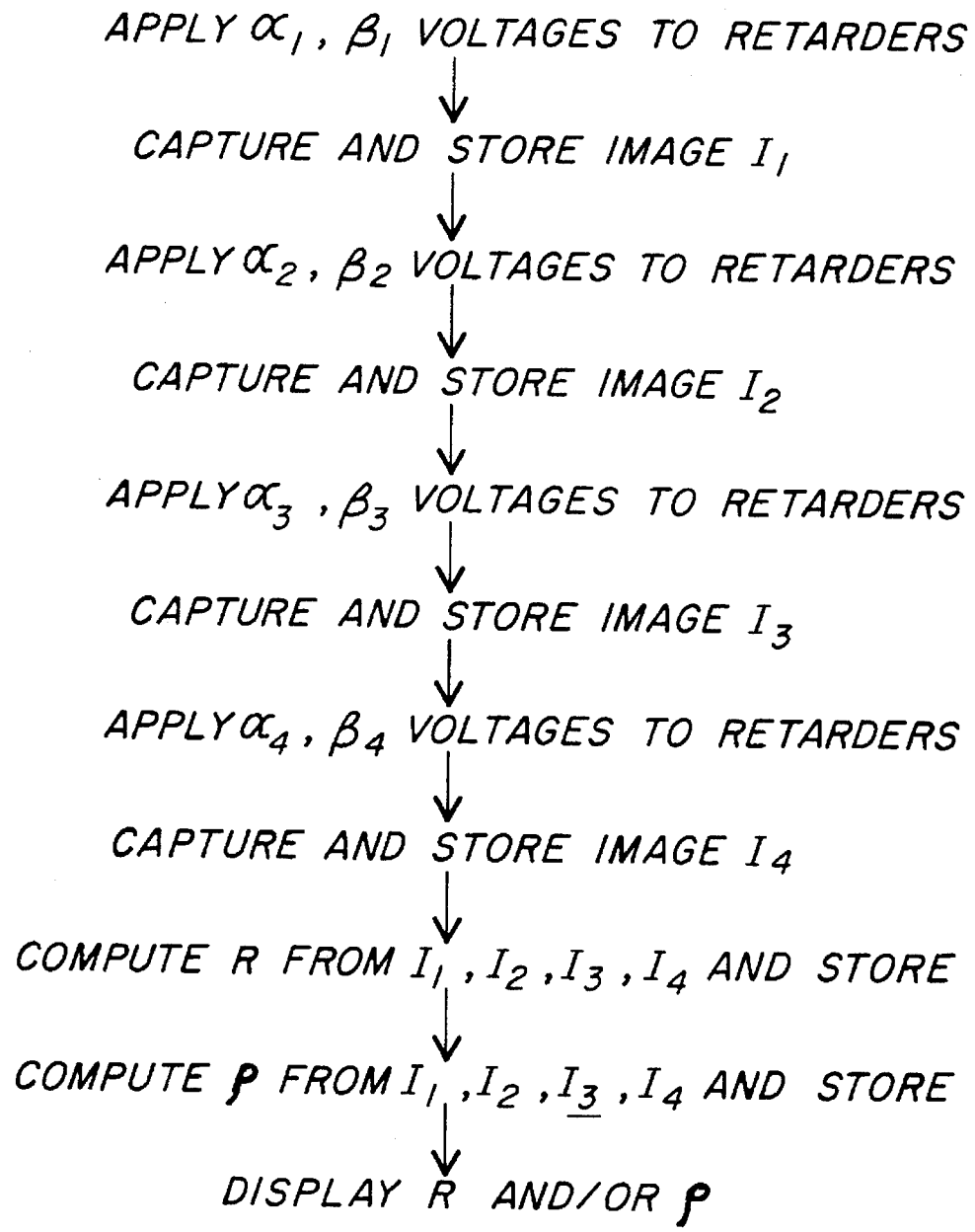
FIG. 5 is a simplified flow-chart illustrating the sequence of operation of an embodiment of the present invention.

The operational sequence of the systems of FIGS. 1–3, under the control of computer 34, is generally as shown in FIG. 5. The computer software used is NIH Image, a public domain program known available from NIH at NIH computer address "anonymous ftp zippy.nimh.nih.gov", modified by addition of a program the source code of which is attached as Appendix A. The program used in the illustrated systems permits the four images used to determine retardance to be captured in a total of 0.33 seconds (if only a single image is taken at each of the retarder voltage settings), or in 1.27 seconds (if eight frames are taken at each set of voltages and averaged).

The data for each of the four images $I_i$, R, and is stored in a respective frame buffer. Any image $I_i$ may be displayed. R and may also be displayed, either separately or, as shown in FIG. 4, together.

OTHER EMBODIMENTS

It is know that high extinction of linear polarized light in a microscope can be realized with the addition of a polarization rectifier to the optical path; the polarization rectifier removes the polarization distortion introduced by the curved lens surfaces especially of high numerical aperture lenses. It has been found that circular polarized light can also be modified. For linear polarized light, without rectification, the distortion pattern of the polarization results in four bright quadrants, observed in the back aperture of the objective or condenser lens. With circular polarized light, a radially symmetric intensity increase form the center outward is observed. Both patterns are induced by the radially symmetric linear "dichroism" (differential transmission) of curved lens surfaces. The linear rectifier consists of two parts, a zero power lens which has an equivalent linear dichroism as, e.g., the condenser lens, and a half wave plate to flip the rotation of polarization induced by the zero- power lens. When using circular polarized light, a second half-wave plate is added with its fast axis rotated by 45° with respect to the first wave plate. This combination of two half wave plates acts as a 90° rotator for elliptical polarization. The rectification then works as follows: Circular polarized light first enters the zero power lens and emerges elliptically polarized, with the long axes oriented radially outward in the aperture. After the light passes through the two half wave plates, the polarization is rotated by 90° and the short axes of the polarization ellipses now point in the radial direction. When the light continues through the regular lens system, e.g., the condenser, it emerges with circular polarization and the analyzer blocks most of the light. This enables good extinction, which increases the sensitivity of the pol-scope of the present invention.

The optical set-up and measurement systems described above are sensitive not only to linear birefringence, but also to linear dichroism in the specimen. To distinguish between the two forms of optical anisotropy, measurements at different illumination wavelengths should be performed; dichroism is strongly wavelength dependent, while birefringence is only weakly dependent on wavelength. To accomplish this, the above-described systems may be modified as described above.

The above systems are also suitable for measuring the polarization in specimen fluorescence. The combination of retarders and circular polarizer in the imaging path of the microscope can be used to analyze any polarization state of the light emitted by the specimen. When the microscope is operated in the transmission mode, the excitation light would be polarized and effectively blocked by the analyzer. In addition, excellent barrier filters are available for transmission fluorescence microscopy.

These and other embodiments will be within the scope of the following claims:

Appendix A

```
unit User;

{This module is a good place to put user additions to Image. You will need }
{to uncomment the call to InitUser in Image.p.} interface uses
{modification starts}
  QuickDraw, Palettes, QDOffscreen, PictUtil, PrintTraps, Globals, Utilities, Graphics, Filters, Edit,{}
  Analysis, Camera, file1, file2, Lut, Stacks;
{modification ends} procedure InitUser;
  procedure DoUserMenuEvent (MenuItem: integer)
  procedure UserMacroCode (str: str255; Param1, Param2, Param3: extended);

implementation
{User global variables go here.}
  const
    MaxWidth = 640;
  var
    Maxretauto, Maxretmanual, Maxazimuthauto: real.
    MaxAlphaMinBackground, MaxBetaMinBackground, MinAlphaMinBackground,
MinBetaMinBackground: real;

procedure InitUser;
  begin
  UserMenuH := GetMenu(UserMenu);
  InsertMenu(UserMenuH, 0);
  DrawMenuBar;
  {Additional user initialization code goes here.}
  end;

{following was added by Guang Mei on 9/22/93}
{----------------------->    Retauto      <---------------}
procedure Retauto;
 var
  slices, sRow, slice, i, SaveSlice: integer;
  width, height, hstart, vStart: integer;
  OldInfo, NewInfo: InfoPtr;
  aLine1, aLine2, aLine3, aLine4: LineType;
  mask: rect;
  AutoSelectAll: boolean;
  sum: array[0..MaxWidth] of Real;
  str1: str255;
  h: handle;
  isRoi, update: boolean;
begin
OldInfo := Info;
with info^ do
 begin
 if StackInfo = nil then
  begin
  PutMessage('Calculating Ret requires a stack.');
  macro := false;
  exit(Retauto);
```

```
  end;
AutoSelectAll := not Info^.RoiShowing;
if AutoSelectAll then
  SelectAll(true);
with RoiRect do
begin
hStart := left;
vStart := top;
width := right - left;
height := bottom - top;
end;
with StackInfo^ do
begin
slices := StackInfo^.nSlices;
SaveSlice := CurrentSlice;
end;
end;
with info^, info^.StackInfo^ do
begin  {of addslice}
if nSlices = MaxSlices then
  exit(Retauto);
isRoi := RoiShowing;
if isRoi then
  KillRoi;
h := GetBigHandle(PixMapSize);
if h = nil then
begin
PutMessage('Not enough memory available to add a slice to this stack.');
macro := false;
exit(Retauto);
end;
if nSlices = 4 then  {add a new slice only if nslice = 4}
begin
nSlices := nSlices + 1;
CurrentSlice := 5;                                          {make current slice be 5}
PicBaseH[CurrentSlice] := h;
SelectSlice(CurrentSlice);
if Update then
  begin
  SelectAll(false);
  DoOperation(EraseOp);
  UpdatePicWindow;
  end;
UpdateTitleBar;
if isRoi then
  RestoreRoi;
WhatToUndo := NothingToUndo;
changes := true;
PictureType := NewPicture;
UpdateWindowsMenuItem(PixMapSize * nSlices, title, PicNum);
end;
end;  {of add slice}
SetCursor(watch);
Maxretauto := 0;
{1st time to just get Maxret value}
for sRow := vStart to vStart + height - 1 do
 begin
 SelectSlice(1);
```

```
GetLine(hStart, sRow, width, aLine1);
SelectSlice(2);
GetLine(hStart, sRow, width, aLine2);
SelectSlice(3);
GetLine(hStart, sRow, width, aLine3);
SelectSlice(4);
GetLine(hStart, sRow, width, aLine4);
for i := 0 to width - 1 do
 begin
 if aLine1[i] + aLine1[i] - aLine3[i] - aLine4[i] = 0 then
  sum[i] := 0
 else
  sum[i] := 0.5 * sqrt((aLine2[i] + aLine2[i] - aLine3[i] - aLine4[i]) * (aLine2[i] + aLine2[i] - aLine3[i] -
aLine4[i]) + (aLine3[i] - aLine4[i]) * (aLine3[i] - aLine4[i])) / abs(aLine1[i] + aLine1[i] - aLine3[i] -
aLine4[i]);
         {ret}
  if sum[i] > Maxretauto then
   Maxretauto := sum[i];
  end;
 if CommandPeriod then
  leave;
 end;
RealToString(Maxretauto, 5, 5, str1);
Showmessage(concat('Maximum ret', cr, 'value = ', cr, str1));
User1^[20] := Maxretauto;      {assign the value so it can be used in macro}
User1^[30] := hStart;
User1^[31] := vStart;
{finish compute Maxretauto}
if AutoSelectAll then
 KillRoi;
{2nd time to get ret value and scale it}
for sRow := vStart to vStart + height - 1 do
 begin
 SelectSlice(1);
 GetLine(hStart, sRow, width, aLine1);
 SelectSlice(2);
 GetLine(hStart, sRow, width, aLine2);
 SelectSlice(3);
 GetLine(hStart, sRow, width, aLine3);
 SelectSlice(4);
 GetLine(hStart, sRow, width, aLine4);
 for i := 0 to width - 1 do
  begin
  if aLine1[i] + aLine1[i] - aLine3[i] - aLine4[i] = 0 then
   sum[i] := 0
  else
   sum[i] := 0.5 * sqrt((aLine2[i] + aLine2[i] - aLine3[i] - aLine4[i]) * (aLine2[i] + aLine2[i] - aLine3[i] -
aLine4[i]) + (aLine3[i] - aLine4[i]) * (aLine3[i] - aLine4[i])) / abs(aLine1[i] + aLine1[i] - aLine3[i] -
aLine4[i]);
         {ret}
  sum[i] := sum[i] * 255.0 / Maxretauto;      {multiply by scaling factor}
  aLine1[i] := Trunc(sum[i]);                 { convert to a Longint}
  if aLine1[i] > 255 then
   aLine1[i] := 255;
  if aLine1[i] < 0 then
   aLine1[i] := 0;
  aLine1[i] := 255 - aLine1[i];     {invert the image}
  end;
```

```
SelectSlice(5);              {activate ret window}
PutLine(hStart, sRow, width, aLine1);
SetRect(mask, hStart, sRow, hStart + width, sRow + 1);
UpdateScreen(mask);
if CommandPeriod then
  leave;
  end;       {finish the ret calculation process}
{3rd time to put a hidden RetMax value to image }
width := 1;
aLine1[0] := round(100 * Maxretauto);      {multiply by 100}
SelectSlice(5);
PutLine(hStart, vStart, width, aLine1);
SetRect(mask, hStart, vStart, hStart + width, vStart + 1);
UpdateScreen(mask);
SetupRoiRect;
beep;    {finish the ret calculation process}
info := OldInfo;
if AutoSelectAll then
  KillRoi;
end;

{---------------->   Retmanualconversion      <----------------}
procedure Retmanualconversion;
  var
    slices, sRow, slice, i, SaveSlice: integer;
    width, height, hstart, vStart: integer;
    OldInfo, NewInfo: InfoPtr;
    aLine1, aLine2, aLine3, aLine4: LineType;
    mask: rect;
    AutoSelectAll: boolean;
    sum: array[0..MaxWidth] of Real;
    str1: str255;
    h: handle;
    isRoi, update, WasCanceled: boolean;
  begin
  OldInfo := Info;
  with info^ do
   begin
   if StackInfo = nil then
     begin
     PutMessage('Calculating Ret requires a stack.');
     macro := false;
     exit(Retmanualconversion);
     end;
   AutoSelectAll := not Info^.RoiShowing;
   if AutoSelectAll then
     SelectAll(true);
   with RoiRect do
     begin
     hStart := left;
     vStart := top;
     width := right - left;
     height := bottom - top;
     end;
   with StackInfo^ do
     begin
     slices := StackInfo^.nSlices;
     end;
```

```
end;
with info^, info^.StackInfo^ do
begin  {of addslice}
if nSlices = MaxSlices then
 exit(Retmanualconversion);
isRoi := RoiShowing;
if isRoi then
 KillRoi;
h := GetBigHandle(PixMapSize);
if h = nil then
 begin
 PutMessage('Not enough memory available to add a slice to this stack.');
 macro := false;
 exit(Retmanualconversion);
 end;
if nSlices = 4 then    {add a new slice only if nslice = 4}
 begin
 nSlices := nSlices + 1;
 CurrentSlice := 5;                                               {make current slice be 5}
 PicBaseH[CurrentSlice] := h;
 SelectSlice(CurrentSlice);
 if Update then
  begin
  SelectAll(false);
  DoOperation(EraseOp);
  UpdatePicWindow;
  end;
 UpdateTitleBar;
 if isRoi then
  RestoreRoi;
 WhatToUndo := NothingToUndo;
 changes := true;
 PictureType := NewPicture;
 UpdateWindowsMenuItem(PixMapSize * nSlices, title, PicNum);
 end;
end;           {of add slice}
SetCursor(watch);
{compute ret value and scale it}
if Maxretmanual = 0 then
 begin
 Maxretmanual := GetReal('Input ret conversion factor:', 0.5, WasCanceled);
 if WasCanceled then
  exit(Retmanualconversion);
 end
else
 User1^[20] := Maxretmanual;
User1^[30] := hStart;
User1^[31] := vStart;
for sRow := vStart to vStart + height - 1 do
 begin
 SelectSlice(1);
 GetLine(hStart, sRow, width, aLine1);
 SelectSlice(2);
 GetLine(hStart, sRow, width, aLine2);
 SelectSlice(3);
 GetLine(hStart, sRow, width, aLine3);
 SelectSlice(4);
 GetLine(hStart, sRow, width, aLine4);
```

```
for i := 0 to width - 1 do
begin
sum[i] := aLine2[i] + aLine2[i] - aLine3[i] - aLine4[i];        {compute 2 * I2 - (I3 + I4)}
sum[i] := sum[i] * sum[i];                                       {Xmin square}
sum[i] := sqrt(sum[i] + (aLine3[i] - aLine4[i]) * (aLine3[i] - aLine4[i]));   {squareroot of it}
if aLine1[i] + aLine1[i] - aLine3[i] - aLine4[i] = 0 then
 sum[i] := 0
else
 sum[i] := 0.5 * sum[i] / (aLine1[i] + aLine1[i] - aLine3[i] - aLine4[i]);    {ret}
sum[i] := sum[i] * 255.0 / Maxretmanual;         {multiply by scaling factor}
aLine1[i] := Trunc(sum[i]);                      {Trunc: convert Real to Longint}
if aLine1[i] > 255 then
 aLine1[i] := 255;
if aLine1[i] < 0 then
 aLine1[i] := 0;
aLine1[i] := 255 - aLine1[i];      {invert the image}
end;
SelectSlice(5);            {activate ret window}
PutLine(hStart, sRow, width, aLine1);
SetRect(mask, hStart, sRow, hStart + width, sRow + 1);
UpdateScreen(mask);
if CommandPeriod then
 leave;
end;      {finish the ret calculation process}
{2nd time to put a hidden RetMax value to image }
width := 1;
GetLine(hStart, sRow, width, aLine1);
aLine1[0] := round(100 * Maxretmanual);     {multiply by 100}
SelectSlice(5);
PutLine(hStart, vStart, width, aLine1);
SetRect(mask, hStart, vStart, hStart + width, vStart + 1);
UpdateScreen(mask);
SetupRoiRect;
beep;    {finish the ret calculation process}
info := OldInfo;
if AutoSelectAll then
 KillRoi;
end;

{-----------------------> Azimuthauto    <---------------}
procedure Azimuthauto;
var
 slices, sRow, slice, i, SaveSlice: integer;
 width, height, hstart, vStart: integer;
 OldInfo, NewInfo: InfoPtr;
 aLine1, aLine2, aLine3, aLine4: LineType;
 mask: rect;
 AutoSelectAll: boolean;
 sum: array[0..MaxWidth] of Real;
 str1: str255;
 h: handle;
 isRoi, update: boolean;
begin
OldInfo := Info;
with info^ do
begin
if StackInfo = nil then
 begin
```

```
PutMessage('Calculating azimuth requires a stack.');
macro := false;
exit(Azimuthauto);
end;
AutoSelectAll := not Info^.RoiShowing;
if AutoSelectAll then
 SelectAll(true);
with RoiRect do
begin
 hStart := left;
 vStart := top;
 width := right - left;
 height := bottom - top;
end;
if width > MaxWidth then
 begin
 PutMessage(concat('Image can"t average selections wider than ', Long2str(MaxWidth), ' pixels.'));
 macro := false;
 exit(Azimuthauto);
 end;
with StackInfo^ do
 begin
 slices := StackInfo^.nSlices;
 SaveSlice := CurrentSlice;
 end;
end;
with info^, info^.StackInfo^ do
begin  {adding 1st slice}
 if nSlices = MaxSlices then
  exit(Azimuthauto);
 isRoi := RoiShowing;
 if isRoi then
  KillRoi;
 h := GetBigHandle(PixMapSize);
 if h = nil then
  begin
  PutMessage('Not enough memory available to add a slice to this stack.');
  macro := false;
  exit(Azimuthauto);
  end;
 if nSlices = 4 then
 begin     {adding 5th slice only if there are 4 slices in the stack}
  nSlices := nSlices + 1;
  CurrentSlice := 5;
  PicBaseH[CurrentSlice] := h;                                  {make current slice be 5}
  SelectSlice(CurrentSlice);
 if Update then
  begin
  SelectAll(false);
  DoOperation(EraseOp);
  UpdatePicWindow;
  end;
 UpdateTitleBar;
 if isRoi then
  RestoreRoi;
 WhatToUndo := NothingToUndo;
 changes := true;
 PictureType := NewPicture;
```

```
UpdateWindowsMenuItem(PixMapSize * nSlices, title, PicNum);
   end;
  end; {of adding 5th slice}
  with info^, info^.StackInfo^ do
  begin     {adding 6th slice}
  if nSlices = MaxSlices then
    exit(Azimuthauto);
  isRoi := RoiShowing;
  if isRoi then
    KillRoi;
  h := GetBigHandle(PixMapSize);
  if h = nil then
  begin
    PutMessage('Not enough memory available to add a slice to this stack.');
    macro := false;
    exit(Azimuthauto);
  end;
  if nSlices = 5 then {add a new slice only if nslice = 5}
  begin
    nSlices := 6;
    CurrentSlice := 6;
    PicBaseH[CurrentSlice] := h;                              {make current slice be 6}
    SelectSlice(CurrentSlice);
    if Update then
    begin
      SelectAll(false);
      DoOperation(EraseOp);
      UpdatePicWindow;
    end;
    UpdateTitleBar;
    if isRoi then
      RestoreRoi;
    WhatToUndo := NothingToUndo;
    changes := true;
    PictureType := NewPicture;
    UpdateWindowsMenuItem(PixMapSize * nSlices, title, PicNum);
  end;
  end;       {of adding 6th slice}
{of adding 2 slices}
{get azimuth value and scale it;}
for sRow := vStart to vStart + height - 1 do
begin
SelectSlice(1);
GetLine(hStart, sRow, width, aLine1);
SelectSlice(2);
GetLine(hStart, sRow, width, aLine2);
SelectSlice(3);
GetLine(hStart, sRow, width, aLine3);
SelectSlice(4);
GetLine(hStart, sRow, width, aLine4);
for i := 0 to width - 1 do
begin
if aLine2[i] + aLine2[i] - aLine3[i] - aLine4[i] <> 0 then
  sum[i] := (90 / 3.14159) * arctan((aLine3[i] - aLine4[i]) / (aLine2[i] + aLine2[i] - aLine3[i] - aLine4[i]))
else if (aLine3[i] - aLine4[i]) < 0 then
  sum[i] := 45            {Ymin < 0 case}
else
  sum[i] := -45;          {Ymin > 0 case}
```

```
  if (aLine2[i] + aLine2[i] - aLine3[i] - aLine4[i]) / (aLine1[i] + aLine1[i] - aLine3[i] - aLine4[i]) > 0 then
    sum[i] := 45 + sum[i]
  else
    sum[i] := 135 + sum[i];        {already include Xmin=0 situation}
    aLine1[i] := Trunc(sum[i]);               {Trunc: convert Real to Longint}
    aLine1[i] := (aline1[i] + 45) mod 180;    {add the atificial offset to take into account of analyzer
direction}
{aLine1[i] := 180 - aLine1[i]; }
     {invert the image}
  end;
SelectSlice(6);          {activate azimuth window}
PutLine(hStart, sRow, width, aLine1);
SetRect(mask, hStart, sRow, hStart + width, sRow + 1);
UpdateScreen(mask);
if CommandPeriod then
  leave;
  end;      {finish the azimuth calculation process}
Restoreroi;
SetupRoiRect;
beep;    {finish the azimuth calculation process}
info := OldInfo;
if AutoSelectAll then
  KillRoi;
end;

{-----------------------> Retandazimuth     <---------------}
procedure Retandazimuth;
var
  slices, sRow, slice, i, SaveSlice: integer;
  width, height, hstart, vStart: integer;
  OldInfo: InfoPtr;
  aLine1, aLine2, aLine3, aLine4: LineType;
  mask: rect;
  AutoSelectAll: boolean;
  sum: array[0..MaxWidth] of Real;
  str1: str255;
  h: handle;
  isRoi: boolean;
  update: boolean;
begin
Retauto;
Restoreroi;
{because ROI was killed at the end of Retauto calculation}
OldInfo := Info;
with info^ do
  begin
  AutoSelectAll := not Info^.RoiShowing;
  if AutoSelectAll then
    SelectAll(true);
  with RoiRect do
    begin
    hStart := left;
    vStart := top;
    width := right - left;
    height := bottom - top;
    end;
  with StackInfo^ do
    begin
```

```
       slices := StackInfo^.nSlices;
       SaveSlice := CurrentSlice;
      end;
     end;
    {begin of adding azimuth slice}
    with info^, info^.StackInfo^ do
    begin {adding the slice}
     if nSlices = MaxSlices then
      exit(Retandazimuth);
     isRoi := RoiShowing;
     if isRoi then
      KillRoi;
     h := GetBigHandle(PixMapSize);
     if h = nil then
      begin
      PutMessage('Not enough memory available to add a slice to this stack.');
      macro := false;
      exit(Retandazimuth);
     end;
     if nSlices = 5 then{add a new slice only if nslice = 6}
     begin
      nSlices := nSlices + 1;
      CurrentSlice := 6;                                                      {make current slice be 6}
      PicBaseH[CurrentSlice] := h;
      SelectSlice(CurrentSlice);
      if Update then
       begin
       SelectAll(false);
       DoOperation(EraseOp);
       UpdatePicWindow;
       end;
      UpdateTitleBar;
      if isRoi then
       RestoreRoi;
      WhatToUndo := NothingToUndo;
      changes := true;
      PictureType := NewPicture;
      UpdateWindowsMenuItem(PixMapSize * nSlices, title, PicNum);
     end;
    end; {of adding the slice}
    {get azimuth value and scale it}
    for sRow := vStart to vStart + height - 1 do
     begin
     SelectSlice(1);
     GetLine(hStart, sRow, width, aLine1);
     SelectSlice(2);
     GetLine(hStart, sRow, width, aLine2);
     SelectSlice(3);
     GetLine(hStart, sRow, width, aLine3);
     SelectSlice(4);
     GetLine(hStart, sRow, width, aLine4);
     for i := 0 to width - 1 do
      begin
      if aLine2[i] + aLine2[i] - aLine3[i] - aLine4[i] = 0 then
       sum[i] := 0
      else
       sum[i] := (90 / 3.14159) * arctan((aLine3[i] - aLine4[i]) / (aLine2[i] + aLine2[i] - aLine3[i] - aLine4[i]));
      if (aLine2[i] + aLine2[i] - aLine3[i] - aLine4[i]) / (aLine1[i] + aLine1[i] - aLine3[i] - aLine4[i]) > 0 then
```

```
  sum[i] := 45 + sum[i]
 else
  sum[i] := 135 + sum[i];
  aLine1[i] := Trunc(sum[i]);              {Trunc: convert Real to Longint}
  aLine1[i] := (aline1[i] + 45) mod 180;   {add the atificial offset to take into account of analyzer
direction}
{aLine1[i] := 180 - aLine1[i]; }
     {invert the image}
  end;
  SelectSlice(6);              {activate azimuth window}
  PutLine(hStart, sRow, width, aLine1);
  SetRect(mask, hStart, sRow, hStart + width, sRow + 1);
  UpdateScreen(mask);
  if CommandPeriod then
   leave;
  end;        {finish the azimuth calculation process}
 SetupRoiRect;
 beep;   {finish the azimuth calculation process}
 info := OldInfo;
 if AutoSelectAll then
   KillRoi;
 if isRoi then   {added these two lines}
   KillRoi;
end;

{------------------> QuickAndDirtyAverage     <---------------}
procedure QuickAndDirtyAverage (SliceNumber: real);
 const
  MaxWidth = 2048;
 var
  slices, sRow, aRow, slice, i, SaveSlice: integer;
  width, height, hstart, vStart: integer;
  OldInfo, NewInfo: InfoPtr;
  aLine, aLine1, aLine2, aLine3, aLine4: LineType;
  mask: rect;
  AutoSelectAll: boolean;
  sum: array[0..MaxWidth] of Real;
  str1: str255;
  h: handle;
  isRoi: boolean;
  update: boolean;
  k: integer;
  AverageNumber: real;
begin
 OldInfo := Info;
 with info^ do
  begin
   if StackInfo = nil then
    begin
     PutMessage('Calculating Ret requires a stack.');
     macro := false;
     exit(QuickAndDirtyAverage);
    end;
   AutoSelectAll := not Info^.RoiShowing;
   if AutoSelectAll then
    SelectAll(true);
   with RoiRect do
    begin
```

```
        hStart := left;
        vStart := top;
        width := right - left;
        height := bottom - top;
       end;
     if width > MaxWidth then
      begin
      PutMessage(concat('Image can"t average selections wider than ', Long2str(MaxWidth), ' pixels.'));
      macro := false;
      exit(QuickAndDirtyAverage);
      end;
     with StackInfo^ do
     begin
     slices := StackInfo^.nSlices;
     SaveSlice := CurrentSlice;
     end;
    end;
   for k := 1 to 4 do
   begin
   AverageNumber := 1.0 * k;
   RealToString(AverageNumber, 2, 0, str1);
   if not NewPicWindow(concat('Average', str1), width, height) then
    begin
    macro := false;
    exit(QuickAndDirtyAverage);
    end;
   NewInfo := Info;
   aRow := 0;
   for sRow := vStart to vStart + height - 1 do
    begin
    info := OldInfo;
    for i := 0 to width - 1 do
     sum[i] := 0;
    for slice := 1 + round(SliceNumber) * (k - 1) to round(SliceNumber) * k do
     begin
     SelectSlice(slice);
     GetLine(hStart, sRow, width, aLine);
     for i := 0 to width - 1 do
      sum[i] := sum[i] + aLine[i];
     end;
    for i := 0 to width - 1 do
     aLine[i] := round(sum[i] / 8);
    info := NewInfo;
    PutLine(0, aRow, width, aLine);
    SetRect(mask, 0, aRow, width, aRow + 1);
    aRow := aRow + 1;
    UpdateScreen(mask);
    if CommandPeriod then
     leave;
    end;
   info := OldInfo;
   if AutoSelectAll then
    KillRoi;
   end;
  end;

{---------------->   inputretconversionfactor    <--------}
procedure inputretconversionfactor (Value1: real);
```

```
var
 str1: str255;
begin
Maxretmanual := Value1;
RealtoString(Maxretmanual, 5, 3, str1);
Showmessage(concat('Manual', cr, 'conversion', cr, 'factor = ', cr, str1));
end;

{----------------------> TimeScan      <----------------}
{See "Macintosh Pascal Programming Primer, Vol.1 ", by Dave Mark and Cartwright Reed, page 186,
DrawClock}
{Call No: QA76.8.M3M3677, ISBN 0-201-57084-X}
procedure TimeScan (Value1, Value2, Value3: real);
 const
  INCLUDE_SECONDS = TRUE;
 var
  gstep, gCurrentTime, gTargetTime: Longint;
  myTimeString: str255;
  i: integer;
begin
gstep := round(Value3) - 2;   {offset 2 sec needs to be deducted, from experience, I still don't know why}
GetDateTime(gCurrentTime);
gTargetTime := gCurrentTime + gstep;
repeat
if CommandPeriod then
 leave;
GetDateTime(gCurrentTime);
until gCurrentTime >= gTargetTime;
IUTimeString(gCurrentTime, INCLUDE_SECONDS, myTimeString);
Showmessage(concat('myTimeString = ', cr, myTimeString));
gTargetTime := gCurrentTime + gstep;
end;

{------------> AlphaAndBetaMinBackground      <------------}
procedure AlphaAndBetaMinBackground;
 var
  slices, sRow, slice, i, SaveSlice: integer;
  width, height, hstart, vStart: integer;
  OldInfo: InfoPtr;
  aLine1, aLine2, aLine3, aLine4: LineType;
  mask: rect;
  AutoSelectAll: boolean;
  sum: array[0..MaxWidth] of Real;
  str1, str2: str255;
  h: handle;
  isRoi, update: boolean;
begin
{------> Start to compute AlphaMinBackground <-------}
OldInfo := Info;
with info^ do
begin
if StackInfo = nil then
 begin
 PutMessage('Calculating AlphaMinBackground requires a stack.');
 macro := false;
 exit(AlphaAndBetaMinBackground);
 end;
AutoSelectAll := not Info^.RoiShowing;
```

```
if AutoSelectAll then
 SelectAll(true);
with RoiRect do
 begin
 hStart := left;
 vStart := top;
 width := right - left;
 height := bottom - top;
 end;
if width > MaxWidth then
 begin
 PutMessage(concat('Image can''t average selections wider than ', Long2str(MaxWidth), ' pixels.'));
 macro := false;
 exit(AlphaAndBetaMinBackground);
 end;
with StackInfo^ do
 begin
 slices := StackInfo^.nSlices;
 SaveSlice := CurrentSlice;
 end;
end;
with info^, info^.StackInfo^ do
 begin   {of addslice}
 if nSlices = MaxSlices then
  exit(AlphaAndBetaMinBackground);
 isRoi := RoiShowing;
 if isRoi then
  KillRoi;
 h := GetBigHandle(PixMapSize);
 if h = nil then
  begin
  PutMessage('Not enough memory available to add a slice to this stack.');
  macro := false;
  exit(AlphaAndBetaMinBackground);
  end;
 if nSlices = 4 then
  nSlices := nSlices + 1;
 CurrentSlice := 5;                                    {make current slice be 5}
 PicBaseH[CurrentSlice] := h;
 SelectSlice(CurrentSlice);
 if Update then
  begin
  SelectAll(false);
  DoOperation(EraseOp);
  UpdatePicWindow;
  end;
 UpdateTitleBar;
 if isRoi then
  RestoreRoi;
 WhatToUndo := NothingToUndo;
 changes := true;
 PictureType := NewPicture;
 UpdateWindowsMenuItem(PixMapSize * nSlices, title, PicNum);
 end;             {of add slice}
SetCursor(watch);
MaxAlphaMinBackground := -9999;
MinAlphaMinBackground := 9999;
{1st time to just get MaxAlphaMinBackground and MinAlphaMinBackground values}
```

```
for sRow := vStart to vStart + height - 1 do
begin
SelectSlice(1);
GetLine(hStart, sRow, width, aLine1);
SelectSlice(2);
GetLine(hStart, sRow, width, aLine2);
SelectSlice(3);
GetLine(hStart, sRow, width, aLine3);
SelectSlice(4);
GetLine(hStart, sRow, width, aLine4);
for i := 0 to width - 1 do
begin
if aLine1[i] + aLine1[i] - aLine3[i] - aLine4[i] = 0 then
 sum[i] := 0
else
 sum[i] := 0.5 * ((aLine2[i] + aLine2[i] - aLine3[i] - aLine4[i]) / (aLine1[i] + aLine1[i] - aLine3[i] - aLine4[i]));
if sum[i] > MaxAlphaMinBackground then
 MaxAlphaMinBackground := sum[i];
if sum[i] < MinAlphaMinBackground then
 MinAlphaMinBackground := sum[i];
end;
if CommandPeriod then
 leave;
end;
MaxAlphaMinBackground := trunc(100 * MaxAlphaMinBackground + 1) / 100;   {take only 2 digits and add 0.01 as upper limit}
MinAlphaMinBackground := trunc(100 * MinAlphaMinBackground - 1) / 100;   {take only 2 digits and subtract 0.01 as lower limit}
RealToString(MaxAlphaMinBackground, 5, 5, str1);
RealToString(MinAlphaMinBackground, 5, 5, str2);
Showmessage(concat('Maximum', cr, 'AlphaMinBackground', cr, 'value = ', cr, str1, cr, 'Minimum', cr, 'AlphaMinBackground', cr, 'value = ', cr, str2));
 {finish looking for MaxAlphaMinBackground}
if AutoSelectAll then
 KillRoi;
{2nd time to get AlphaMinBackground value, add the offset, and scale it}
for sRow := vStart to vStart + height - 1 do
begin
SelectSlice(1);
GetLine(hStart, sRow, width, aLine1);
SelectSlice(2);
GetLine(hStart, sRow, width, aLine2);
SelectSlice(3);
GetLine(hStart, sRow, width, aLine3);
SelectSlice(4);
GetLine(hStart, sRow, width, aLine4);
for i := 0 to width - 1 do
begin
if aLine1[i] + aLine1[i] - aLine3[i] - aLine4[i] = 0 then
 sum[i] := 0
else
 sum[i] := -MinAlphaMinBackground + 0.5 * (aLine2[i] + aLine2[i] - aLine3[i] - aLine4[i]) / (aLine1[i] + aLine1[i] - aLine3[i] - aLine4[i]);   {shift}
sum[i] := sum[i] * 255.0 / (MaxAlphaMinBackground - MinAlphaMinBackground);   {multiply by scaling factor}
aLine1[i] := round(sum[i]);       {take only 2 digits}
if aLine1[i] > 255 then
```

```
  aLine1[i] := 255;
  if aLine1[i] < 0 then
   aLine1[i] := 0;
  aLine1[i] := 255 - aLine1[i];      {invert the image}
 end;
 SelectSlice(5);          {activate AlphaMinBackground window}
 PutLine(hStart, sRow, width, aLine1);
 SetRect(mask, hStart, sRow, hStart + width, sRow + 1);
 UpdateScreen(mask);
 if CommandPeriod then
  leave;
 end;       {finish the AlphaMinBackground calculation process}
{3rd time to put a hidden MaxAlphaMinBackground and MinAlphaMinBackground values to the image }
 width := 2;
 for i := 0 to width - 1 do
  begin    {encipher MaxAlphaMinBackground and MinAlphaMinBackground values}
  aLine1[0] := round(100 * MaxAlphaMinBackground + 100);    {encipher, multiply by 100, then add
100}
  aLine1[1] := round(100 * MinAlphaMinBackground + 100);    {multiply by 100, then add 100}
  SelectSlice(5);
  PutLine(hStart, vStart, width, aLine1);
  SetRect(mask, hStart, vStart, hStart + width, vStart + 1);
  UpdateScreen(mask);
 end; {finish the AlphaMinBackground calculation process}
 info := OldInfo;
 if AutoSelectAll then
  KillRoi;
{------------>   Start to compute BetaMinBackground       <-----------}
 OldInfo := Info;
 with info^ do
 begin
 AutoSelectAll := not Info^.RoiShowing;
 if AutoSelectAll then
  SelectAll(true);
 with RoiRect do
  begin
  hStart := left;
  vStart := top;
  width := right - left;
  height := bottom - top;
  end;
 with StackInfo^ do
  begin
  slices := StackInfo^.nSlices;
  SaveSlice := CurrentSlice;
  end;
 end;
{beginning of adding BetaMinBackground slice}
 with info^, info^.StackInfo^ do
 begin {adding the slice}
 if nSlices = MaxSlices then
  exit(AlphaAndBetaMinBackground);
 isRoi := RoiShowing;
 if isRoi then
  KillRoi;
 h := GetBigHandle(PixMapSize);
 if h = nil then
  begin
```

```
PutMessage('Not enough memory available to add a slice to this stack.');
macro := false;
exit(AlphaAndBetaMinBackground);
end;
if nSlices = 5 then
 nSlices := nSlices + 1;
CurrentSlice := 6;                                              {make current slice be 6}
PicBaseH[CurrentSlice] := h;
SelectSlice(CurrentSlice);
if Update then
 begin
 SelectAll(false);
 DoOperation(EraseOp);
 UpdatePicWindow;
 end;
UpdateTitleBar;
if isRoi then
 RestoreRoi;
WhatToUndo := NothingToUndo;
changes := true;
PictureType := NewPicture;
UpdateWindowsMenuItem(PixMapSize * nSlices, title, PicNum);
end;  {of adding the slice}
{get BetaMinBackground value and scale it}
MaxBetaMinBackground := -9999;
MinBetaMinBackground := 9999;
{1st time to just get MaxBetaMinBackground and MinBetaMinBackground values}
for sRow := vStart to vStart + height - 1 do
 begin
 SelectSlice(1);
 GetLine(hStart, sRow, width, aLine1);
 SelectSlice(2);
 GetLine(hStart, sRow, width, aLine2);
 SelectSlice(3);
 GetLine(hStart, sRow, width, aLine3);
 SelectSlice(4);
 GetLine(hStart, sRow, width, aLine4);
 for i := 0 to width - 1 do
  begin
  if aLine1[i] + aLine1[i] - aLine3[i] - aLine4[i] = 0 then
   sum[i] := 0
  else
   sum[i] := 0.5 * (aLine3[i] - aLine4[i]) / (aLine1[i] + aLine1[i] - aLine3[i] - aLine4[i]);
  if sum[i] > MaxBetaMinBackground then
   MaxBetaMinBackground := sum[i];
  if sum[i] < MinBetaMinBackground then
   MinBetaMinBackground := sum[i];
  end;
 if CommandPeriod then
  leave;
 end;
MaxBetaMinBackground := trunc(100 * MaxBetaMinBackground + 1) / 100;    {take only 2 digits and
add 0.01 as upper limit}
MinBetaMinBackground := trunc(100 * MinBetaMinBackground - 1) / 100;    {take only 2 digits and
subtract 0.01 as lower limit}
RealToString(MaxBetaMinBackground, 5, 5, str1);
RealToString(MinBetaMinBackground, 5, 5, str2);
```

```
Showmessage(concat('Maximum', cr, 'BetaMinBackground', cr, 'value = ', cr, str1, cr, 'Minimum', cr,
'BetaMinBackground', cr, 'value = ', cr, str2));
  {finish looking for MaxBetaMinBackground}
if AutoSelectAll then
  KillRoi;
{2nd time to get BetaMinBackground value and scale it}
for sRow := vStart to vStart + height - 1 do
  begin
  SelectSlice(1);
  GetLine(hStart, sRow, width, aLine1);
  SelectSlice(2);
  GetLine(hStart, sRow, width, aLine2);
  SelectSlice(3);
  GetLine(hStart, sRow, width, aLine3);
  SelectSlice(4);
  GetLine(hStart, sRow, width, aLine4);
  for i := 0 to width - 1 do
    begin
    if aLine1[i] + aLine1[i] - aLine3[i] - aLine4[i] = 0 then
      sum[i] := 0
    else
      sum[i] := -MinBetaMinBackground + 0.5 * (aLine3[i] - aLine4[i]) / (aLine1[i] + aLine1[i] - aLine3[i] -
aLine4[i]);  {shift}
    sum[i] := sum[i] * 255.0 / (MaxBetaMinBackground - MinBetaMinBackground);       {multiply by
scaling factor}
    aLine1[i] := round(sum[i]);
    if aLine1[i] > 255 then
      aLine1[i] := 255;
    if aLine1[i] < 0 then
      aLine1[i] := 0;
    aLine1[i] := 255 - aLine1[i];        {invert the image}
    end;
  SelectSlice(6);            {activate BetaMinBackground window}
  PutLine(hStart, sRow, width, aLine1);
  SetRect(mask, hStart, sRow, hStart + width, sRow + 1);
  UpdateScreen(mask);
  if CommandPeriod then
    leave;
  end;         {finish the BetaMinBackground calculation process}
{3rd time to put a hidden MaxBetaMinBackground and MinBetaMinBackground values to the image }
width := 2;
for i := 0 to width - 1 do
  begin      {encipher MaxAlphaMinBackground and MinAlphaMinBackground values}
  aLine1[0] := round(100 * MaxBetaMinBackground + 100);      {multiply by 100, then add 100}
  aLine1[1] := round(100 * MinBetaMinBackground + 100);      {multiply by 100, then add 100}
  SelectSlice(6);            {activate BetaMinBackground window}
  PutLine(hStart, vStart, width, aLine1);
  SetRect(mask, hStart, vStart, hStart + width, vStart + 1);
  UpdateScreen(mask);
  end;  {finish the BetaMinBackground calculation process}
SetupRoiRect;
info := OldInfo;
if AutoSelectAll then
  KillRoi;
{this section deletes the 4 orginal background slices and change the title:}
with info^, Info^.StackInfo^ do
  begin
```

```
CurrentSlice := 1; {need this to bring the 1st slice front, in order to delete that,can not use SelectSlice(1)
directly}
{SelectSlice(1); }
        {this line is not necessary, because 1st slice is in front, otherwise the current front stack will be
deleted}
  Deleteslice;        { delete 1st slice}
{SelectSlice(2);}
        {this line is not necessary,because 2nd slice is in front after 1st is deleted}
  Deleteslice;        { delete 2nd slice}
{SelectSlice(3);}
        {this line is not necessary,because 3rd slice is in front after 4th is deleted}
  Deleteslice;        { delete 3rd slice}
{SelectSlice(4);}
        {this line is not necessary,because 4th slice is in front after 3rd is deleted}
  Deleteslice;        { delete 4th slice}
  title := concat(title, '5&6');
  UpdateTitleBar;
  end;
  beep;   {finish the Background calculation process}
  end;

{----------> RetautoWithBackgroundCorrection    <-----------}
procedure RetautoWithBackgroundCorrection;
 var
  slices, sRow, slice, i, SaveSlice, BackGroundPic: integer;
  width, height, hstart, vStart: integer;
  OldInfo, RetInfo, BackGroundInfo: InfoPtr;
  aLine1, aLine2, aLine3, aLine4, aLine5, aLine6: LineType;
  mask: rect;
  AutoSelectAll: boolean;
  sum, sumAlpha, sumBeta: array[0..MaxWidth] of Real;
  str1: str255;
  h: handle;
  isRoi, update: boolean;
begin
OldInfo := Info;
with info^ do
 begin
 if StackInfo = nil then
  begin
  PutMessage('Calculating Ret requires a stack.');
  macro := false;
  exit(RetautoWithBackgroundCorrection);
  end;
 AutoSelectAll := not Info^.RoiShowing;
 if AutoSelectAll then
  SelectAll(true);
 with RoiRect do
  begin
  hStart := left;
  vStart := top;
  width := right - left;
  height := bottom - top;
  end;
 if width > MaxWidth then
  begin
  PutMessage(concat('Image can"t average selections wider than ', Long2str(MaxWidth), ' pixels.'));
```

```
  macro := false;
  exit(RetautoWithBackgroundCorrection);
  end;
 with StackInfo^ do
 begin
 slices := StackInfo^.nSlices;
 SaveSlice := CurrentSlice;
 end;
end;
with info^, info^.StackInfo^ do
begin   {of addslice}
if nSlices = MaxSlices then
  exit(RetautoWithBackgroundCorrection);
isRoi := RoiShowing;
if isRoi then
  KillRoi;
h := GetBigHandle(PixMapSize);
if h = nil then
  begin
  PutMessage('Not enough memory available to add a slice to this stack.');
  macro := false;
  exit(RetautoWithBackgroundCorrection);
  end;
if nSlices = 4 then{add a new slice only if nslice = 4}
  begin
  nSlices := nSlices + 1;
  CurrentSlice := 5;                              {make current slice be 5}
  PicBaseH[CurrentSlice] := h;
  SelectSlice(CurrentSlice);
  if Update then
    begin
    SelectAll(false);
    DoOperation(EraseOp);
    UpdatePicWindow;
    end;
  UpdateTitleBar;
  if isRoi then
    RestoreRoi;
  WhatToUndo := NothingToUndo;
  changes := true;
  PictureType := NewPicture;
  UpdateWindowsMenuItem(PixMapSize * nSlices, title, PicNum);
  end;
  end;       {of add slice}
RetInfo := Info;
BackGroundPic := 1;
Info := pointer(WindowPeek(PicWindow[BackGroundPic])^.RefCon);
BackGroundInfo := Info;      {assign it to BackGroundInfo}
SetCursor(watch);
Info := BackGroundInfo;      {activate BackGround stack, can be neglected here if one wants to}
for i := 0 to width - 1 do
  begin        {Get Min and Max values of background first}
  SelectSlice(1);
  GetLine(0, 0, width, aLine1);
  MaxAlphaMinBackground := (aLine1[0] - 100) / 100;
  MinAlphaMinBackground := (aLine1[1] - 100) / 100;
  SelectSlice(2);
  GetLine(0, 0, width, aLine1);
```

```
MaxBetaMinBackground := (aLine1[0] - 100) / 100;
MinBetaMinBackground := (aLine1[1] - 100) / 100;
end;
User1^[21] := MaxAlphaMinBackground;        {assign the values so they can be used in macro}
User1^[22] := MinAlphaMinBackground;
User1^[23] := MaxBetaMinBackground;
User1^[24] := MinBetaMinBackground;
User1^[30] := hStart;
User1^[31] := vStart;
{1st time to just get Maxret value}
Maxretauto := 0;
sRow := vStart;             {first row of the ROI}
SelectSlice(1);
GetLine(hStart, sRow, width, aLine5);
SelectSlice(2);
GetLine(hStart, sRow, width, aLine6);
for i := 2 to width - 1 do
begin
{skip the first two pixels which represent the MaxBackGround and MinBackGround}
   sumAlpha[i] := MinAlphaMinBackground + (255 - aLine5[i]) * (MaxAlphaMinBackground -
MinAlphaMinBackground) / 255.0;
   sumBeta[i] := MinBetaMinBackground + (255 - aLine6[i]) * (MaxBetaMinBackground -
MinBetaMinBackground) / 255.0;
end;
Info := RetInfo;              {activate image data stack}
SelectSlice(1);
GetLine(hStart, sRow, width, aLine1);
SelectSlice(2);
GetLine(hStart, sRow, width, aLine2);
SelectSlice(3);
GetLine(hStart, sRow, width, aLine3);
SelectSlice(4);
GetLine(hStart, sRow, width, aLine4);
for i := 2 to width - 1 do
begin
if aLine1[i] + aLine1[i] - aLine3[i] - aLine4[i] = 0 then
  sum[i] := 0
else
begin
   sum[i] := 0.5 * (aLine2[i] + aLine2[i] - aLine3[i] - aLine4[i]) / (aLine1[i] + aLine1[i] - aLine3[i] -
aLine4[i]);
   sumAlpha[i] := (sum[i] - sumAlpha[i]) * (sum[i] - sumAlpha[i]);   {use sumAlpha [ i ] as Alpha }
   sum[i] := 0.5 * (aLine3[i] - aLine4[i]) / (aLine1[i] + aLine1[i] - aLine3[i] - aLine4[i]);
   sumBeta[i] := (sum[i] - sumBeta[i]) * (sum[i] - sumBeta[i]);
   sum[i] := sqrt(sumAlpha[i] + sumBeta[i]);
end;
if sum[i] > Maxretauto then
  Maxretauto := sum[i];
end;
for sRow := vStart + 1 to vStart + height - 1 do
begin       {start from the 2nd row of the ROI}
Info := BackGroundInfo;            {activate BackGround stack}
SelectSlice(1);
GetLine(hStart, sRow, width, aLine5);
SelectSlice(2);
GetLine(hStart, sRow, width, aLine6);
for i := 0 to width - 1 do
begin
```

```
  sumAlpha[i] := MinAlphaMinBackground + (255 - aLine5[i]) * (MaxAlphaMinBackground -
MinAlphaMinBackground) / 255.0;
  sumBeta[i] := MinBetaMinBackground + (255 - aLine6[i]) * (MaxBetaMinBackground -
MinBetaMinBackground) / 255.0;
  end;
  Info := RetInfo;              {activate image data stack}
  SelectSlice(1);
  GetLine(hStart, sRow, width, aLine1);
  SelectSlice(2);
  GetLine(hStart, sRow, width, aLine2);
  SelectSlice(3);
  GetLine(hStart, sRow, width, aLine3);
  SelectSlice(4);
  GetLine(hStart, sRow, width, aLine4);
  for i := 0 to width - 1 do
   begin
   if aLine1[i] + aLine1[i] - aLine3[i] - aLine4[i] = 0 then
    sum[i] := 0
   else
    begin
    sum[i] := 0.5 * (aLine2[i] + aLine2[i] - aLine3[i] - aLine4[i]) / (aLine1[i] + aLine1[i] - aLine3[i] -
aLine4[i]);
    sumAlpha[i] := (sum[i] - sumAlpha[i]) * (sum[i] - sumAlpha[i]);   {use sumAlpha [ i ] as Alpha }
    sum[i] := 0.5 * (aLine3[i] - aLine4[i]) / (aLine1[i] + aLine1[i] - aLine3[i] - aLine4[i]);
    sumBeta[i] := (sum[i] - sumBeta[i]) * (sum[i] - sumBeta[i]);
    sum[i] := sqrt(sumAlpha[i] + sumBeta[i]);
    end;
   if sum[i] > Maxretauto then
    Maxretauto := sum[i];
   end;
  if CommandPeriod then
   leave;
  end;
 RealToString(Maxretauto, 5, 5, str1);
 Showmessage(str1);
 {Showmessage(concat('Maximum ret', cr, 'value = ', cr, str1));}
    {This above line doesn't work, don't know why}
 User1^[20] := Maxretauto;     {assign the value so it can be used in macro}
 {finish compute Maxretauto}
 if AutoSelectAll then
  KillRoi;
 {2nd time to get ret value and scale it}
 Info := BackGroundInfo;            {activate BackGround stack}
 sRow := vStart;          {first row of the ROI}
 SelectSlice(1);
 GetLine(hStart, sRow, width, aLine5);
 SelectSlice(2);
 GetLine(hStart, sRow, width, aLine6);
 for i := 2 to width - 1 do
  begin
  {skip the first two pixels which represent the MaxBackGround and MinBackGround}
   sumAlpha[i] := MinAlphaMinBackground + (255 - aLine5[i]) * (MaxAlphaMinBackground -
MinAlphaMinBackground) / 255.0;
   sumBeta[i] := MinBetaMinBackground + (255 - aLine6[i]) * (MaxBetaMinBackground -
MinBetaMinBackground) / 255.0;
  end;
  Info := RetInfo;              {activate image data stack}
  SelectSlice(1);
```

```
GetLine(hStart, sRow, width, aLine1);
SelectSlice(2);
GetLine(hStart, sRow, width, aLine2);
SelectSlice(3);
GetLine(hStart, sRow, width, aLine3);
SelectSlice(4);
GetLine(hStart, sRow, width, aLine4);
for i := 2 to width - 1 do
  begin
  if aLine1[i] + aLine1[i] - aLine3[i] - aLine4[i] = 0 then
    sum[i] := 0
  else
    begin
    sum[i] := 0.5 * (aLine2[i] + aLine2[i] - aLine3[i] - aLine4[i]) / (aLine1[i] + aLine1[i] - aLine3[i] -
aLine4[i]);
    sumAlpha[i] := (sum[i] - sumAlpha[i]) * (sum[i] - sumAlpha[i]);    {use sumAlpha [ i ] as Alpha }
    sum[i] := 0.5 * (aLine3[i] - aLine4[i]) / (aLine1[i] + aLine1[i] - aLine3[i] - aLine4[i]);
    sumBeta[i] := (sum[i] - sumBeta[i]) * (sum[i] - sumBeta[i]);
    sum[i] := sqrt(sumAlpha[i] + sumBeta[i]);
    sum[i] := sum[i] * 255.0 / Maxretauto;    {multiply by scaling factor}
    end;
  aLine1[i] := round(sum[i]);                  {Trunc: convert Real to Longint}
  if aLine1[i] > 255 then
    aLine1[i] := 255;
  if aLine1[i] < 0 then
    aLine1[i] := 0;
  aLine1[i] := 255 - aLine1[i];        {invert the image}
  end;
SelectSlice(5);              {activate ret window}
PutLine(hStart, sRow, width, aLine1);
SetRect(mask, hStart, sRow, hStart + width, sRow + 1);
UpdateScreen(mask);
{finish 1st row computation}
for sRow := vStart + 1 to vStart + height - 1 do
  begin      {start from the 2nd row of the ROI}
  Info := BackGroundInfo;                {activate BackGround stack}
  SelectSlice(1);
  GetLine(hStart, sRow, width, aLine5);
  SelectSlice(2);
  GetLine(hStart, sRow, width, aLine6);
  for i := 0 to width - 1 do
    begin
    sumAlpha[i] := MinAlphaMinBackground + (255 - aLine5[i]) * (MaxAlphaMinBackground -
MinAlphaMinBackground) / 255.0;
    sumBeta[i] := MinBetaMinBackground + (255 - aLine6[i]) * (MaxBetaMinBackground -
MinBetaMinBackground) / 255.0;
    end;
  Info := RetInfo;            {activate image data stack}
  SelectSlice(1);
  GetLine(hStart, sRow, width, aLine1);
  SelectSlice(2);
  GetLine(hStart, sRow, width, aLine2);
  SelectSlice(3);
  GetLine(hStart, sRow, width, aLine3);
  SelectSlice(4);
  GetLine(hStart, sRow, width, aLine4);
  for i := 0 to width - 1 do
    begin
```

```
      if aLine1[i] + aLine1[i] - aLine3[i] - aLine4[i] = 0 then
        sum[i] := 0
      else
       begin
        sum[i] := 0.5 * (aLine2[i] + aLine2[i] - aLine3[i] - aLine4[i]) / (aLine1[i] + aLine1[i] - aLine3[i] -
aLine4[i]);
        sumAlpha[i] := (sum[i] - sumAlpha[i]) * (sum[i] - sumAlpha[i]);    {use sumAlpha [ i ]  as Alpha }
        sum[i] := 0.5 * (aLine3[i] - aLine4[i]) / (aLine1[i] + aLine1[i] - aLine3[i] - aLine4[i]);
        sumBeta[i] := (sum[i] - sumBeta[i]) * (sum[i] - sumBeta[i]);
        sum[i] := sqrt(sumAlpha[i] + sumBeta[i]);
        sum[i] := sum[i] * 255.0 / Maxretauto;    {multiply by scaling factor}
       end;
       aLine1[i] := round(sum[i]);               {Trunc: convert Real to Longint}
       if aLine1[i] > 255 then
         aLine1[i] := 255;
       if aLine1[i] < 0 then
         aLine1[i] := 0;
       aLine1[i] := 255 - aLine1[i];    {invert the image}
      end;
      SelectSlice(5);          {activate ret window}
      PutLine(hStart, sRow, width, aLine1);
      SetRect(mask, hStart, sRow, hStart + width, sRow + 1);
      UpdateScreen(mask);
      if CommandPeriod then
       leave;
      end;        {finish the ret calculation process}
     {3rd time to put a hidden RetMax value to image }
     width := 1;
     aLine1[0] := round(100 * Maxretauto);
         {multiply by 100}
     SelectSlice(5);
     PutLine(hStart, vStart, width, aLine1);
     SetRect(mask, hStart, vStart, hStart + width, vStart + 1);
     UpdateScreen(mask);
     SetupRoiRect;
     beep;    {finish the ret calculation process}
     info := OldInfo;
     if AutoSelectAll then
      KillRoi;
    end;

{----------> RetManualWithBackgroundCorrection <----------}
procedure RetManualWithBackgroundCorrection;
 var
  slices, sRow, slice, i, SaveSlice, BackGroundPic: integer;
  width, height, hstart, vStart: integer;
  OldInfo, RetInfo, BackGroundInfo: InfoPtr;
  aLine1, aLine2, aLine3, aLine4, aLine5, aLine6: LineType;
  mask: rect;
  AutoSelectAll: boolean;
  sum, sumAlpha, sumBeta: array[0..MaxWidth] of Real;
  str1: str255;
  h: handle;
  isRoi, update, WasCanceled: boolean;
 begin
  OldInfo := Info;
  with info^ do
```

```
begin
if StackInfo = nil then
 begin
 PutMessage('Calculating Ret requires a stack.');
 macro := false;
 exit(RetManualWithBackgroundCorrection);
 end;
AutoSelectAll := not Info^.RoiShowing;
if AutoSelectAll then
 SelectAll(true);
with RoiRect do
 begin
 hStart := left;
 vStart := top;
 width := right - left;
 height := bottom - top;
 end;
if width > MaxWidth then
 begin
 PutMessage(concat('Image can"t average selections wider than ', Long2str(MaxWidth), ' pixels.'));
 macro := false;
 exit(RetManualWithBackgroundCorrection);
 end;
with StackInfo^ do
 begin
 slices := StackInfo^.nSlices;
 SaveSlice := CurrentSlice;
 end;
end;
with info^, info^.StackInfo^ do
 begin  {of addslice}
 if nSlices = MaxSlices then
  exit(RetManualWithBackgroundCorrection);
 isRoi := RoiShowing;
 if isRoi then
  KillRoi;
 h := GetBigHandle(PixMapSize);
 if h = nil then
  begin
  PutMessage('Not enough memory available to add a slice to this stack.');
  macro := false;
  exit(RetManualWithBackgroundCorrection);
  end;
 if nSlices = 4 then{add a new slice only if nslice = 4}
  begin
  nSlices := nSlices + 1;
  CurrentSlice := 5;                                          {make current slice be 5}
  PicBaseH[CurrentSlice] := h;
  SelectSlice(CurrentSlice);
  if Update then
   begin
   SelectAll(false);
   DoOperation(EraseOp);
   UpdatePicWindow;
   end;
  UpdateTitleBar;
  if isRoi then
   RestoreRoi;
```

```
    WhatToUndo := NothingToUndo;
    changes := true;
    PictureType := NewPicture;
    UpdateWindowsMenuItem(PixMapSize * nSlices, title, PicNum);
   end;
  end;         {of add slice}
 RetInfo := Info;
 BackGroundPic := 1;
 Info := pointer(WindowPeek(PicWindow[BackGroundPic])^.RefCon);
 BackGroundInfo := Info;       {assign it to BackGroundInfo}
 SetCursor(watch);
 Info := BackGroundInfo;       {activate BackGround stack, can be neglected here if one wants to}
 for i := 0 to width - 1 do
   begin       {Get Min and Max values of background first}
   SelectSlice(1);
   GetLine(0, 0, width, aLine1);
   MaxAlphaMinBackground := (aLine1[0] - 100) / 100;
   MinAlphaMinBackground := (aLine1[1] - 100) / 100;
   SelectSlice(2);
   GetLine(0, 0, width, aLine1);
   MaxBetaMinBackground := (aLine1[0] - 100) / 100;
   MinBetaMinBackground := (aLine1[1] - 100) / 100;
   end;
 if Maxretmanual = 0 then
   begin
   Maxretmanual := GetReal('Input ret conversion factor:', 0.5, WasCanceled);
   if WasCanceled then
    exit(RetManualWithBackgroundCorrection);
   end
 else
   User1^[20] := Maxretmanual;        {assign the values so they can be used in macro}
   User1^[21] := MaxAlphaMinBackground;
   User1^[22] := MinAlphaMinBackground;
   User1^[23] := MaxBetaMinBackground;
   User1^[24] := MinBetaMinBackground;
   User1^[30] := hStart;
   User1^[31] := vStart;
 {start to compute Ret value and scale it}
   sRow := vStart;              {first row of the ROI}
   SelectSlice(1);
   GetLine(hStart, sRow, width, aLine5);
   SelectSlice(2);
   GetLine(hStart, sRow, width, aLine6);
   for i := 2 to width - 1 do
    begin
 {skip the first two pixels which represent the MaxBackGround and MinBackGround}
    sumAlpha[i] := MinAlphaMinBackground + (255 - aLine5[i]) * (MaxAlphaMinBackground -
 MinAlphaMinBackground) / 255.0;
    sumBeta[i] := MinBetaMinBackground + (255 - aLine6[i]) * (MaxBetaMinBackground -
 MinBetaMinBackground) / 255.0;
    end;
   Info := RetInfo;            {activate image data stack}
   SelectSlice(1);
   GetLine(hStart, sRow, width, aLine1);
   SelectSlice(2);
   GetLine(hStart, sRow, width, aLine2);
   SelectSlice(3);
   GetLine(hStart, sRow, width, aLine3);
```

```
SelectSlice(4);
GetLine(hStart, sRow, width, aLine4);
for i := 2 to width - 1 do
  begin
  if aLine1[i] + aLine1[i] - aLine3[i] - aLine4[i] = 0 then
    sum[i] := 0
  else
    begin
    sum[i] := 0.5 * (aLine2[i] + aLine2[i] - aLine3[i] - aLine4[i]) / (aLine1[i] + aLine1[i] - aLine3[i] -
aLine4[i]);
    sumAlpha[i] := (sum[i] - sumAlpha[i]) * (sum[i] - sumAlpha[i]);   {use sumAlpha [ i ] as Alpha }
    sum[i] := 0.5 * (aLine3[i] - aLine4[i]) / (aLine1[i] + aLine1[i] - aLine3[i] - aLine4[i]);
    sumBeta[i] := (sum[i] - sumBeta[i]) * (sum[i] - sumBeta[i]);
    sum[i] := sqrt(sumAlpha[i] + sumBeta[i]);
    end;
  aLine1[i] := round(sum[i]);           {Trunc: convert Real to Longint}
  if aLine1[i] > 255 then
    aLine1[i] := 255;
  if aLine1[i] < 0 then
    aLine1[i] := 0;
  aLine1[i] := 255 - aLine1[i];        {invert the image}
  end;
SelectSlice(5);            {activate ret window}
PutLine(hStart, sRow, width, aLine1);
SetRect(mask, hStart, sRow, hStart + width, sRow + 1);
UpdateScreen(mask);
{finish 1st row computation}
for sRow := vStart + 1 to vStart + height - 1 do
  begin      {start from the 2nd row of the ROI}
  Info := BackGroundInfo;            {activate BackGround stack}
  SelectSlice(1);
  GetLine(hStart, sRow, width, aLine5);
  SelectSlice(2);
  GetLine(hStart, sRow, width, aLine6);
  for i := 0 to width - 1 do
    begin
    sumAlpha[i] := MinAlphaMinBackground + (255 - aLine5[i]) * (MaxAlphaMinBackground -
MinAlphaMinBackground) / 255.0;
    sumBeta[i] := MinBetaMinBackground + (255 - aLine6[i]) * (MaxBetaMinBackground -
MinBetaMinBackground) / 255.0;
    end;
  Info := RetInfo;           {activate image data stack}
  SelectSlice(1);
  GetLine(hStart, sRow, width, aLine1);
  SelectSlice(2);
  GetLine(hStart, sRow, width, aLine2);
  SelectSlice(3);
  GetLine(hStart, sRow, width, aLine3);
  SelectSlice(4);
  GetLine(hStart, sRow, width, aLine4);
  for i := 0 to width - 1 do
    begin
    if aLine1[i] + aLine1[i] - aLine3[i] - aLine4[i] = 0 then
      sum[i] := 0
    else
      begin
      sum[i] := 0.5 * (aLine2[i] + aLine2[i] - aLine3[i] - aLine4[i]) / (aLine1[i] + aLine1[i] - aLine3[i] -
aLine4[i]);
```

```
sumAlpha[i] := (sum[i] - sumAlpha[i]) * (sum[i] - sumAlpha[i]);    {use sumAlpha [ i ] as Alpha }
sum[i] := 0.5 * (aLine3[i] - aLine4[i]) / (aLine1[i] + aLine1[i] - aLine3[i] - aLine4[i]);
sumBeta[i] := (sum[i] - sumBeta[i]) * (sum[i] - sumBeta[i]);
sum[i] := sqrt(sumAlpha[i] + sumBeta[i]);
sum[i] := sum[i] * 255.0 / Maxretmanual;    {multiply by scaling factor}
end;
aLine1[i] := round(sum[i]);                 {Trunc: convert Real to Longint}
if aLine1[i] > 255 then
 aLine1[i] := 255;
if aLine1[i] < 0 then
 aLine1[i] := 0;
aLine1[i] := 255 - aLine1[i];    {invert the image}
end;
SelectSlice(5);              {activate ret window}
PutLine(hStart, sRow, width, aLine1);
SetRect(mask, hStart, sRow, hStart + width, sRow + 1);
UpdateScreen(mask);
if CommandPeriod then
 leave;
end;        {finish the ret calculation process}
{2nd time to put a hidden RetMax value to image }
width := 1;
aLine1[0] := round(100 * Maxretmanual);
     {multiply by 100}
SelectSlice(5);
PutLine(hStart, vStart, width, aLine1);
SetRect(mask, hStart, vStart, hStart + width, vStart + 1);
UpdateScreen(mask);
SetupRoiRect;
beep;   {finish the ret calculation process}
info := OldInfo;
if AutoSelectAll then
 KillRoi;
end;

{---------> AzimuthautoWithBackgroundCorrection    <-----------}
procedure AzimuthautoWithBackgroundCorrection;
 var
  slices, sRow, slice, i, SaveSlice, BackGroundPic: integer;
  width, height, hstart, vStart: integer;
  OldInfo, RetInfo, BackGroundInfo: InfoPtr;
  aLine1, aLine2, aLine3, aLine4, aLine5, aLine6: LineType;
  mask: rect;
  AutoSelectAll: boolean;
  sum, sumAlpha, sumBeta: array[0..MaxWidth] of Real;
  str1: str255;
  h: handle;
  isRoi: boolean;
  update: boolean;
begin
OldInfo := Info;
with info^ do
 begin
 if StackInfo = nil then
  begin
  PutMessage('Calculating azimuth requires a stack.');
  macro := false;
  exit(AzimuthautoWithBackgroundCorrection);
```

```
end;
AutoSelectAll := not Info^.RoiShowing;
if AutoSelectAll then
SelectAll(true);
with RoiRect do
begin
hStart := left;
vStart := top;
width := right - left;
height := bottom - top;
end;
if width > MaxWidth then
begin
PutMessage(concat('Image can"t average selections wider than ', Long2str(MaxWidth), ' pixels.'));
macro := false;
exit(AzimuthautoWithBackgroundCorrection);
end;
with StackInfo^ do
begin
slices := StackInfo^.nSlices;
SaveSlice := CurrentSlice;
end;
end;
with info^, info^.StackInfo^ do
begin {adding 1st slice}
if nSlices = MaxSlices then
exit(AzimuthautoWithBackgroundCorrection);
isRoi := RoiShowing;
if isRoi then
KillRoi;
h := GetBigHandle(PixMapSize);
if h = nil then
begin
PutMessage('Not enough memory available to add a slice to this stack.');
macro := false;
exit(AzimuthautoWithBackgroundCorrection);
end;
if nSlices = 4 then
begin     {adding 5th slice only if there are 4 slices in the stack}
nSlices := nSlices + 1;
CurrentSlice := 5;                                          {make current slice be 5}
PicBaseH[CurrentSlice] := h;
SelectSlice(CurrentSlice);
if Update then
 begin
 SelectAll(false);
 DoOperation(EraseOp);
 UpdatePicWindow;
 end;
UpdateTitleBar;
if isRoi then
 RestoreRoi;
WhatToUndo := NothingToUndo;
changes := true;
PictureType := NewPicture;
UpdateWindowsMenuItem(PixMapSize * nSlices, title, PicNum);
end;
end; {of adding 5th slice}
```

```
with info^, info^.StackInfo^ do
begin    {adding 6th slice}
if nSlices = MaxSlices then
 exit(AzimuthautoWithBackgroundCorrection);
isRoi := RoiShowing;
if isRoi then
 KillRoi;
h := GetBigHandle(PixMapSize);
if h = nil then
begin
PutMessage('Not enough memory available to add a slice to this stack.');
macro := false;
exit(AzimuthautoWithBackgroundCorrection);
end;
if nSlices = 5 then{add a new slice only if nslice = 5}
 begin
 nSlices := 6;
 CurrentSlice := 6;                                          {make current slice be 6}
 PicBaseH[CurrentSlice] := h;
 SelectSlice(CurrentSlice);
 if Update then
  begin
  SelectAll(false);
  DoOperation(EraseOp);
  UpdatePicWindow;
  end;
 UpdateTitleBar;
 if isRoi then
  RestoreRoi;
 WhatToUndo := NothingToUndo;
 changes := true;
 PictureType := NewPicture;
 UpdateWindowsMenuItem(PixMapSize * nSlices, title, PicNum);
 end;
end;        {of adding 6th slice}
{of adding 2 slices}
RetInfo := Info;
BackGroundPic := 1;
Info := pointer(WindowPeek(PicWindow[BackGroundPic])^.RefCon);
BackGroundInfo := Info;       {assign it to BackGroundInfo}
ShowWatch;
{Info := BackGroundInfo; }
     {activate BackGround stack, can be neglected here if one wants to}
for i := 0 to width - 1 do
 begin             {Get Min and Max values of background first}
 SelectSlice(1);
 GetLine(0, 0, width, aLine1);
 MaxAlphaMinBackground := (aLine1[0] - 100) / 100;
 MinAlphaMinBackground := (aLine1[1] - 100) / 100;
 SelectSlice(2);
 GetLine(0, 0, width, aLine1);
 MaxBetaMinBackground := (aLine1[0] - 100) / 100;
 MinBetaMinBackground := (aLine1[1] - 100) / 100;
 end;
User1^[21] := MaxAlphaMinBackground;        {assign the values so they can be used in macro}
User1^[22] := MinAlphaMinBackground;
User1^[23] := MaxBetaMinBackground;
User1^[24] := MinBetaMinBackground;
```

```
User1^[30] := hStart;
User1^[31] := vStart;
{start to compute Azimuth value and scale it}
sRow := vStart;              {first row of the ROI}
SelectSlice(1);
GetLine(hStart, sRow, width, aLine5);
SelectSlice(2);
GetLine(hStart, sRow, width, aLine6);
for i := 2 to width - 1 do
 begin
{skip the first two pixels which represent the MaxBackGround and MinBackGround}
  sumAlpha[i] := MinAlphaMinBackground + (255 - aLine5[i]) * (MaxAlphaMinBackground -
MinAlphaMinBackground) / 255.0;
  sumBeta[i] := MinBetaMinBackground + (255 - aLine6[i]) * (MaxBetaMinBackground -
MinBetaMinBackground) / 255.0;
 end;
Info := RetInfo;              {activate image data stack}
SelectSlice(1);
GetLine(hStart, sRow, width, aLine1);
SelectSlice(2);
GetLine(hStart, sRow, width, aLine2);
SelectSlice(3);
GetLine(hStart, sRow, width, aLine3);
SelectSlice(4);
GetLine(hStart, sRow, width, aLine4);
for i := 2 to width - 1 do
 begin  {computing within a row}
  if aLine1[i] + aLine1[i] - aLine3[i] - aLine4[i] = 0 then
   sum[i] := 0
  else
   begin
   sum[i] := 0.5 * (aLine2[i] + aLine2[i] - aLine3[i] - aLine4[i]) / (aLine1[i] + aLine1[i] - aLine3[i] -
aLine4[i]);
   sumAlpha[i] := (sum[i] - sumAlpha[i]);    {use sumAlpha [ i ] as Alpha }
   sum[i] := 0.5 * (aLine3[i] - aLine4[i]) / (aLine1[i] + aLine1[i] - aLine3[i] - aLine4[i]);
   sumBeta[i] := (sum[i] - sumBeta[i]);
   if sumAlpha[i] <> 0 then       {alpha-alphaMinBG not equal to zero }
    sum[i] := (90 / 3.14159) * arctan(sumBeta[i] / sumAlpha[i])
   else if sumBeta[i] < 0 then    {alpha-alphaMinBG equal to zero }
    sum[i] := -45              {Ymin < 0 case}
   else
    sum[i] := 45;              {Ymin > 0 case}
   if sumAlpha[i] > 0 then        {Sign[xMin] effect}
    sum[i] := 45 + sum[i]
   else
    sum[i] := 135 + sum[i];       {already include Xmin=0 situation}
   end;
  aLine1[i] := round(sum[i]);              {Trunc: convert Real to Longint}
  aLine1[i] := (aline1[i] + 45) mod 180;   {add the atificial offset to take into account of analyzer
direction}
  aLine1[i] := 180 - aLine1[i];    {invert the image}
 end;  {computing within a row}
SelectSlice(6);               {activate azimuth window}
PutLine(hStart, sRow, width, aLine1);
SetRect(mask, hStart, sRow, hStart + width, sRow + 1);
UpdateScreen(mask);
{finish 1st row computation}
for sRow := vStart + 1 to vStart + height - 1 do
```

```
begin    {start from the 2nd row of the ROI}
Info := BackGroundInfo;            {activate BackGround stack}
SelectSlice(1);
GetLine(hStart, sRow, width, aLine5);
SelectSlice(2);
GetLine(hStart, sRow, width, aLine6);
for i := 0 to width - 1 do
  begin
  sumAlpha[i] := MinAlphaMinBackground + (255 - aLine5[i]) * (MaxAlphaMinBackground -
MinAlphaMinBackground) / 255.0;
  sumBeta[i] := MinBetaMinBackground + (255 - aLine6[i]) * (MaxBetaMinBackground -
MinBetaMinBackground) / 255.0;
  end;
Info := RetInfo;            {activate image data stack}
SelectSlice(1);
GetLine(hStart, sRow, width, aLine1);
SelectSlice(2);
GetLine(hStart, sRow, width, aLine2);
SelectSlice(3);
GetLine(hStart, sRow, width, aLine3);
SelectSlice(4);
GetLine(hStart, sRow, width, aLine4);
for i := 0 to width - 1 do
  begin   {computing within a row}
  if aLine1[i] + aLine1[i] - aLine3[i] - aLine4[i] = 0 then
    sum[i] := 0
  else
    begin
    sum[i] := 0.5 * (aLine2[i] + aLine2[i] - aLine3[i] - aLine4[i]) / (aLine1[i] + aLine1[i] - aLine3[i] -
aLine4[i]);
    sumAlpha[i] := (sum[i] - sumAlpha[i]);    {use sumAlpha [ i ] as Alpha }
    sum[i] := 0.5 * (aLine3[i] - aLine4[i]) / (aLine1[i] + aLine1[i] - aLine3[i] - aLine4[i]);
    sumBeta[i] := (sum[i] - sumBeta[i]);
    if sumAlpha[i] <> 0 then        {alpha-alphaMinBG  not equal to zero }
      sum[i] := (90 / 3.14159) * arctan(sumBeta[i] / sumAlpha[i])
    else if sumBeta[i] < 0 then     {alpha-alphaMinBG  equal to zero }
      sum[i] := -45              {Ymin < 0 case}
    else
      sum[i] := 45;              {Ymin > 0 case}
    if sumAlpha[i] > 0 then        {Sign[xMin] effect}
      sum[i] := 45 + sum[i]
    else
      sum[i] := 135 + sum[i];      {already include Xmin=0 situation}
    end;
  aLine1[i] := round(sum[i]);                    {Trunc: convert Real to Longint}
  aLine1[i] := (aline1[i] + 45) mod 180;    {add the atificial offset to take into account of analyzer
direction}
  {aLine1[i] := 180 - aLine1[i]; }
      {invert the image}
  end;  {computing within a row}
SelectSlice(6);            {activate azimuth window}
PutLine(hStart, sRow, width, aLine1);
SetRect(mask, hStart, sRow, hStart + width, sRow + 1);
UpdateScreen(mask);
if CommandPeriod then
  leave;
  end;      {finish the azimuth calculation process}
{2nd time to assign value 1 to the 1st two pixels on the image }
```

```
width := 2;
aLine1[0] := 1;
aLine1[1] := 1;
SelectSlice(6);
PutLine(hStart, vStart, width, aLine1);
SetRect(mask, hStart, vStart, hStart + width, vStart + 1);
UpdateScreen(mask);
Restoreroi;
SetupRoiRect;
beep;    {finish the azimuth calculation process}
info := OldInfo;
if AutoSelectAll then
 KillRoi;
end;

{------------------------> ConvertResultToHSV   <------------------------}
{Conver a six-slice stack (including 4 original images, plus Ret and Azimuth) to a three-slice HSV stack}
{Use Azimuth slice as Hue, Ret slice as Value, Saturation slice is 255 everywhere}
procedure ConvertResultToHSV;
 var
  width, height, i, row: integer;
  sLine: LineType;
  AutoSelectAll: boolean;
begin
with info^ do
begin
if StackInfo^.nSlices <> 6 then
 begin
 PutMessage('Result to HSV color conversion requires a six slice stack as input.');
 exit(ConvertResultToHSV);
 end;
AutoSelectAll := not Info^.RoiShowing;    {select all as ROI}
if AutoSelectAll then
 SelectAll(true);
title := 'HSV';
UpdateTitleBar;
end;
with info^, info^.StackInfo^ do
begin
PicBaseH[1] := PicBaseH[6];              {copy 6th Slice to 1st slice, as H}
PicBaseH[3] := PicBaseH[5];              {copy 5th Slice to 3rd slice, as V}
PicBaseH[6] := PicBaseH[4];              {disassociate 6th slice to the 1st slice}
PicBaseH[5] := PicBaseH[4];              {disassociate 5th slice to the 3rd slice}
end;
KillRoi;   {important, without this, I can not make 2nd Slice dark}
with info^ do
begin         {make slice 2 as Saturation}
width := PixelsPerLine;
height := nLines;
for row := 0 to height - 1 do
 begin
 for i := 0 to width - 1 do
  begin
  sLine[i] := 255;
  end;
 SelectSlice(2);
 PutLine(0, row, width, sLine);
 end;
```

```
  end;
with Info^.StackInfo^ do
 begin
  CurrentSlice := 6;  {need this to bring the 6th slice front, in order to delete that,can not use SelectSlice(6)
directly}
{SelectSlice(6); }
          {this line is not necessary, because 6th slice is in front, otherwise the current front stack will be
deleted}
  Deleteslice;          { delete 6th slice}
{SelectSlice(5);}
          {this line is not necessary,because 5th slice is in front after 6th is deleted}
  Deleteslice;          { delete 5th slice}
{SelectSlice(4);}
          {this line is not necessary,because 4th slice is in front after 5th is deleted}
  Deleteslice;          { delete 4th slice}
 end;
 beep;
end;

{----------------> ConvertResultToSonyVideoPrinterHSV   <----------------------}
{Conver a six-slice stack (including 4 original images, plus Ret and Azimuth) to a three-slice HSV stack}
{The lookup Table was specifically generated using macro command 'Create LUT from LinePlot', and it is
}
{specifically designed to suppress "blue" color in order to get "best" image from color video printer.}
procedure ConvertResultToSonyVideoPrinterHSV;
 var
  width, height, i, row: integer;
  sLine: LineType;
  AutoSelectAll: boolean;
  isRoi, update: boolean;
  RedLUT, GreenLUT, BlueLUT: LutArray;
 begin
 with info^ do
  begin
  if StackInfo^.nSlices <> 6 then
   begin
   PutMessage('Result to HSV color conversion requires a six slice stack as input.');
   exit(ConvertResultToSonyVideoPrinterHSV);
   end;
  AutoSelectAll := not Info^.RoiShowing;    {select all as ROI}
  if AutoSelectAll then
   SelectAll(true);
  title := 'HSV';
  UpdateTitleBar;
  end;
 with info^, info^.StackInfo^ do
  begin
  PicBaseH[1] := PicBaseH[6];         {copy 6th Slice to 1st slice, later used as H}
  PicBaseH[3] := PicBaseH[5];         {copy 5th Slice to 3rd slice, as V}
  PicBaseH[6] := PicBaseH[4];         {disassociate 6th slice to the 1st slice}
  PicBaseH[5] := PicBaseH[4];         {disassociate 5th slice to the 3rd slice}
  end;
 KillRoi;  {important, without this, I can not make 2nd Slice dark}
 with info^, Info^.StackInfo^ do
  begin
  CurrentSlice := 6;  {need this to bring the 6th slice front, in order to delete that,can not use SelectSlice(6)
directly}
{SelectSlice(6); }
```

```
        {this line is not necessary, because 6th slice is in front, otherwise the current front stack will be
deleted}
  Deleteslice;         { delete 6th slice}
{SelectSlice(5);}
        {this line is not necessary,because 5th slice is in front after 6th is deleted}
  Deleteslice;         { delete 5th slice}
{SelectSlice(4);}
        {this line is not necessary,because 4th slice is in front after 5th is deleted}
  Deleteslice;         { delete 4th slice}
  end;
with info^ do
begin       {copy 1st slice (Azimuth) to the 2nd slice because both H and S are from Azimuth}
width := PixelsPerLine;
height := nLines;
for row := 0 to height - 1 do
 begin
 SelectSlice(1);
 GetLine(0, row, width, sLine);
 SelectSlice(2);
 PutLine(0, row, width, sLine);
 end;
end;
with Info^.StackInfo^ do
begin    {process Hue slice with Rudolf's HueLookupTable}
CurrentSlice := 1;
SelectSlice(1);
DoImportLut('HueLookupTable', 0);
ApplyLookupTable;
end;
with Info^.StackInfo^ do
begin    {process Hue slice with Rudolf's SatLookupTable}
CurrentSlice := 2;
SelectSlice(2);
DoImportLut('SatLookupTable', 0);
{get rid of noise on Sat slice, because NIH Image LookupTable makes RedLut[0] =
GreenLut[0]=BlueLut[0] =255}
 RedLut[0] := 31;
 GreenLut[0] := 31;
 BlueLut[0] := 31;
 UpdateLut;
 ApplyLookupTable;
 end;
 beep;
end;

{------------------------> ConvertHSVToRGB  <------------------------}
{See "Fundamentals of Interactive Computer Graphics", by James D. Foley and Andries Van Dam, page
616}
{Call No: T385.F63, ISBN 0-201-14468-9}
procedure ConvertHSVToRGB;
{Given: H, S, V, each in [0,255)}
{Desired: R,G,B, each in [0,255)}
 var
 width, height, i, row, mark: integer;
 rLine, gLine, bLine, hLine, sLine, vLine: LineType;
 R, G, B, H, S, V: integer;
 hreal, f, p, q, t: real;
 j: integer;
```

```
    UpdateR: rect;
begin
with info^ do
 begin
 if StackInfo^.nSlices <> 3 then
  begin
  PutMessage('HSV to RGB color conversion requires a three slice(Hue, saturation and value) stack as
input.');
  exit(ConvertHSVToRGB);
  end;
 KillRoi;
 with StackInfo^ do
  begin
  CurrentSlice := 1;
  SelectSlice(CurrentSlice);
  UpdatePicWindow;
  end;
 title := 'RGB';
 UpdateTitleBar;
 width := PixelsPerLine;
 height := nLines;
 mark := 0;
 ShowWatch;
 for row := 0 to height - 1 do
  begin
  SelectSlice(1);
  GetLine(0, row, width, hLine);
  SelectSlice(2);
  GetLine(0, row, width, sLine);
  SelectSlice(3);
  GetLine(0, row, width, vLine);
  for i := 0 to width - 1 do
   begin     {*****}
   H := hLine[i];
   S := sLine[i];
   V := 255 - vLine[i];   {in oder to be consistent with NIH Image, since NIH image is inverted, see
Procedure ConvertRGBToHSV}
   if S = 0 then
    begin    {along vertical V axis}
    R := V;           {no matter what H value is}
    G := V;
    B := V;
    end
   else
    begin    {S <> 0 situation}
    if h = 255 then
    h := 0;
    hreal := h / 42.5;       {hreal is now in [0, 6)}
    j := trunc(hreal);       {largest integer <=hreal}
    f := hreal - j;          {fraction part of hreal}
    p := V * (1 - S / 255);
    q := V * (1 - (S / 255) * f);
    t := V * (1 - (S / 255) * (1 - f));
    case j of
    0:
     begin
     R := V;
     G := round(t);
```

```
    B := round(p);
  end;
1:
  begin
  R := round(q);
  G := V;
  B := round(p);
  end;
2:
  begin
  R := round(p);
  G := V;
  B := round(t);
  end;
3:
  begin
  R := round(p);
  G := round(q);
  B := V;
  end;
4:
  begin
  R := round(t);
  G := round(p);
  B := V;
  end;
5:
  begin
  R := V;
  G := round(p);
  B := round(q);
  end;
  end;   {of case}
  end;   {S <> 0 situation}
rLine[i] := 255 - R;         {in oder to be consistent with NIH Image, since NIH image is inverted}
gLine[i] := 255 - G;
bLine[i] := 255 - B;
  end;           {*****}
SelectSlice(1);
PutLine(0, row, width, rline);
if (row mod 10) = 0 then
  begin      {update the screen after every 10 lines}
  setrect(UpdateR, 0, mark, width - 1, row);
  mark := row;
  UpdateScreen(UpdateR);
  end;
SelectSlice(2);
PutLine(0, row, width, gLine);
SelectSlice(3);
PutLine(0, row, width, bLine);
  end;
SelectSlice(1);
end; {with}
WhatToUndo := NothingToUndo;
beep;
end;

{----------------> ConvertResultToEightBitColor  <----------------}
```

{Conver a six-slice stack (including 4 original images, plus Ret and Azimuth) to an 8 Bit Color image}
procedure ConvertResultToEightBitColor;
begin
ConvertResultToSonyVideoPrinterHSV;
ConvertHSVToRGB;
ConvertRGBToEightBitColor(false);
end;

procedure AddLineToSum (src, dst: ptr; width: LongInt);
{$IFC false}
 type
  SumLineType = array[0..2047] of integer;
  fptr = ^SumLineType;
 var
  FrameLine: LinePtr;
  SumLine: fptr;
  i: integer;
begin
FrameLine := LinePtr(src);
SumLine := fptr(dst);
{modification starts}
     {this initialization part is added to make sure different NPS images are added up}
{for i := 0 to width - 1 do}
{begin}
{FrameLine^[i] := 0;}
{SumLine^[i] := 0;}
{end;}
{modification ends}
 for i := 0 to width - 1 do
  SumLine^[i] := SumLine^[i] + FrameLine^[i];
 end;
{$ENDC}
inline
{a0=data pointer}
{a1=sum buffer pointer}
{d0=count}
{d1=pixel value}
{d2=temp}
$4E56, $0000, {link      a6,#0}
$48E7, $E0C0, {movem.l         a0-a1/d0-d2,-(sp)}
$206E, $000C, {move.l    12(a6),a0}
$226E, $0008, {move.l    8(a6),a1}
$202E, $0004, {move.l    4(a6),d0}
$5380,        {subq.l    #1,d0}
$4281,        {clr.l     d1}
$4282,        {clr.l     d2}
$1218,        {L1   move.b  (a0)+,d1}
$3411,        {move.w  (a1),d2}
$D441,        {add.w   d1,d2}
$32C2,        {move.w  d2,(a1)+}
$51C8, $FFF6, {dbra      d0,L1}
$4CDF, $0307, {movem.l         (sp)+,a0-a1/d0-d2}
$4E5E,        {unlk      a6}
$DEFC, $000C; {add.w   #12,sp}

{------------------> NPSImagesWithVideoRateCapture <-----------------}

```
procedure NPSImagesWithVideoRateCapture;
{This procedure grabs 32 images (at videorate) to Scion board, then average frame 1-8 as the 1st NPS
slice.}
{frame 2-16 as the 2st NPS slice, frame 17-24 as the 3rd, and frame 25-32 as the last NPS slice.}
{The average process was done without having to load all the original images to the computer.}
type
  IntPtr = ^integer;
  SumLineType = array[0..2047] of integer;
  sptr = ^SumLineType;
var
  AutoSelectAll: boolean;
  SelectionSize, FrameBufferSize, offset, StartTicks: LongInt;
  SumBase, src, srcbase, dst, OffscreenBase: ptr;
  str1, str2: str255;
  xLines, xPixelsPerLine, BytesPerLine, frame, line, pixel: integer;
  aline: LineType;
  GrabRect: rect;
  DisplayPoint: point;
  hstart, vstart, wwidth, wheight: integer;
  j, FramesAveraged: integer;
  SrcRowBytes, DstRowBytes, i, value, MinV, MaxV, range, ActualMin, ActualMax: LongInt;
  FrameLine: LinePtr;
  SumLine: sptr;
  myMMUMode: signedbyte;
  nFrames, wleft, wtop, width, height, iinteger: integer;
  OutOfMemory: boolean;
  NextTicks, interval, ElapsedTime: LongInt;
  seconds: extended;
  frect: rect;
  MainDevice: GDHandle;
  SourcePixMap: PixMapHandle;
  str3: str255;
  tPort: GrafPtr;
  k: integer;
  aLine1: LineType;
  mask: Rect;
begin
with info^ do
  begin
  if (PictureType <> FrameGrabberType) and (PictureType <> ScionType) then
    begin
    PutMessage('You must be capturing to make a movie.');
    exit(NPSImagesWithVideoRateCapture);
    end;
  StopDigitizing;
  if not (RoiShowing and (RoiType = RectRoi)) then
    begin
    PutMessage('Please make a rectangular selection first.');
    exit(NPSImagesWithVideoRateCapture);
    end;
  if NotInBounds then
    exit(NPSImagesWithVideoRateCapture);
  if (not OptionKeyWasDown) and (not macro) then
    begin
  {if not DoMovieOptions then}
  {exit(NPSImagesWithVideoRateCapture);}
  {modification starts}
    FramesToCapture := 32;
```

```
   VideoRateCapturing := true; {modification ends}
   end;
 OptionKeyWasDown := false;
 with RoiRect do
  begin
  left := band(left + 1, $fffc);   {Word align}
  right := band(right + 2, $fffc);
  if right > PicRect.right then
   right := PicRect.right;
  MakeRegion;
  wleft := left;
  wtop := top;
  width := right - left;
  height := bottom - top;
  end;
 end; {with info^}
 if FrameGrabber = Scion then
  begin
  with DisplayPoint do
   begin
   h := PicLeftBase;
   v := PicTopBase;
   end;
  with frect do
   begin
   left := PicLeftBase + wleft;
   top := PicTopBase + wtop;
   right := left + width;
   bottom := top + height;
   end;
  end
 else
  with frect do
   begin
   left := wleft;
   top := wtop;
   right := left + width;
   bottom := top + height;
   end;
 if not NewPicWindow('Movie', width, height) then
  exit(NPSImagesWithVideoRateCapture);
 if not MakeStackFromWindow then
  exit(NPSImagesWithVideoRateCapture);
 if FrameGrabber <> ScionLG3 then
  VideoRateCapturing := false;
 if VideoRateCapturing then
  begin
  if FramesToCapture > MaxLG3Frames then
   FramesToCapture := MaxLG3Frames;
  ExternalTrigger := false;
  end;
 nFrames := 1;
 OutOfMemory := false;
 {modification starts}
 {while (nFrames < FramesToCapture) and (not OutOfMemory) do}
    {the original code creates FramesToCapture slices to hold images}
 while (nFrames < 4) and (not OutOfMemory) do        {we only need to create 4 slices for Polscope
images}
```

```
begin
OutOfMemory := not AddSlice(false);
if not OutOfMemory then
 nFrames := nFrames + 1;
end;
FramesToAverage := FramesToCapture div 4;      {make nFrame = 8}
{modification ends}
if ExternalTrigger or VideoRateCapturing then
FrameDelay := 0.0;
interval := round(60.0 * FrameDelay);
if FrameGrabber = Scion then
begin
HideCursor;
MainDevice := GetMainDevice;
SourcePixMap := MainDevice^^.gdPMap;
end
else
begin
ShowWatch;
SourcePixMap := fgPort^.portPixMap;
ResetFrameGrabber;
end;
ShowTriggerMessage;
StartTicks := TickCount;
NextTicks := StartTicks;
with info^, info^.StackInfo^ do
begin
if Interval >= 30 then
 ShowMessage(CmdPeriodToStop)
else
 DrawLabels('Frame:', 'Total:', '');

for k := 1 to 4 do
    {outer loop starts, loop 4 times, each time capture 8 frames and change DAC settings}
begin
{BufferReg ^ := 0;}
 BufferReg^ := 0 + (k - 1) * FramesToAverage;
{if LG3DacControl then}
 with ScionLG3Values[(k - 1) * FramesToAverage + 1] do
 begin
 DacAReg^ := DacA;         {DacA and DacB values are passed from Macro command StoreScion}
 DacBReg^ := DacB;
 LG3DacA := DacA;
 LG3DacB := DacB;
 if Delay <> 0 then
  for i := 1 to Delay do
   GetFrame;
 end;
 GetFrame;                 {get 1st Frame from camera}
 StartTicks := TickCount - 2;
 for frame := 1 + (k - 1) * FramesToAverage to k * FramesToAverage - 1 do
  begin
  BufferReg^ := frame;
{if LG3DacControl then}
  with ScionLG3Values[frame + 1] do
   begin
   DacAReg^ := DacA;
   DacBReg^ := DacB;
```

```
    LG3DacA := DacA;
    LG3DacB := DacB;
{this section added for testing, By using voltmeter, the test results show that correct voltages were applied
to the DACs.}
{RealToString(1.0 * DacAReg^, 1, 1, str1);}
{RealToString(1.0 * DacBReg^, 1, 1, str2);}
{RealToString(1.0 * frame, 1, 1, str3);}
{Showmessage(concat('frame =', str3, cr, 'DacAReg^ =', str1, cr, 'DacBReg^=', str2));  }
 {tests found that both values are 52}
{wait(30);}
{testing ends}
    if Delay <> 0 then
      for i := 1 to Delay do
      GetFrame;
    end;
    GetFrame;            {get 2nd frame and upto FramesToAverage frame from camera}
   end;
  end; {of k loop}

BufferReg^ := 0;
seconds := (TickCount - StartTicks) / 60.0;
{LoopTime := seconds;}
seconds := 4 * seconds;   {because there are 4 loops, seconds is the time that 1 loop takes}
end; {with}
RealToString(seconds, 1, 2, str1);
str1 := concat(long2str(4 * FramesToAverage),' frames', cr, str1,' seconds', cr);   {FramesToAverage=8}
RealToString(seconds / (4 * FramesToAverage), 1, 3, str2);
str3 := concat(str1, str2,' seconds/frame', cr);
if nFrames >= seconds then
{ShowFrameRate(str3, StartTicks, nFrames)}
 ShowFrameRate(str3, StartTicks, FramesToAverage)
else
 ShowMessage(str3);

{following is modified from Procedure AverageFrame}
{modification starts}
FramesToAverage := 8;
info^.RoiRect := frect;  {very very important! this make correct ROI information passed for average
calculation}
{otherwise the average calculation always starts from (0,0) point}
{modification ends}
with info^.RoiRect do
 SelectionSize := (LongInt(right) - left) * (bottom - top);
FrameBufferSize := SelectionSize * 2;
if FrameBufferSize > BigBufSize then
 begin
 NumToString(FrameBufferSize div 1024, str1);
 NumToString(BigBufSize div 1024, str2);
 str2 := concat(str1,'K bytes are required, but only ', str2,'K bytes are available.');
 PutMessage(concat('There is not enough memory to do the requested frame averaging. ', str2));
 exit(NPSImagesWithVideoRateCapture);
 end;
WhatToUndo := NothingToUndo;
WhatsOnClip := NothingOnClip;
SumBase := BigBuf;
case FrameGrabber of
QuickCapture:
 begin
```

```
ContinuousHistogram := false;
ResetQuickCapture
end;
ScionLG3:
begin
ContinuousHistogram := false;
ResetScionLG3
end;
Scion:
begin
with info^.wrect do
 begin
 wwidth := right;
 wheight := bottom;
 end;
hstart := (640 - wwidth) div 2;
vstart := (480 - wheight) div 2;
SetRect(GrabRect, hstart, vstart, hstart + wwidth, vstart + wheight);
with DisplayPoint do
 begin
 h := PicLeftBase;
 v := PicTopBase;
 end;
ResetScion(GrabRect, DisplayPoint);
HideCursor;
end;
end; {case}
with info^, info^.RoiRect do
begin
offset := left + LongInt(top) * BytesPerRow;
OffscreenBase := ptr(ord4(PicBaseAddr) + offset);
{testing purpose}
{RealToString(1.0 * left, 1, 1, str1);}
{RealToString(1.0 * right, 1, 1, str2);}
{RealToString(1.0 * bottom, 1, 1, str3);}
{Showmessage(concat('left = ', str1, cr, 'right =', str2, cr, 'bottom =', str3));}
{wait(200);}
{testing purpose}
if FrameGrabber = Scion then
 with DisplayPoint do
  begin
  BringToFront(wptr);
  offset := left + h + (v + top) * ScreenRowBytes;
  srcbase := ptr(ord4(ScreenBase) + offset);
  SrcRowBytes := ScreenRowBytes;
  end
else
 begin
 offset := left + LongInt(top) * fgRowBytes;
 srcbase := ptr(ord4(ptr(fgSlotBase)) + offset);
 SrcRowBytes := fgRowBytes;
 end;
xLines := bottom - top;
xPixelsPerLine := right - left;
BytesPerLine := xPixelsPerLine * 2;
end; {with} info^.title := 'NPS Image';
```

```
UpdateTitleBar;
StartTicks := TickCount;

for k := 1 to 4 do
  begin         {outer loop starts, to computer average on Scion board directly, and put the result to the
screen}
  dst := SumBase;              {this part is to refresh dst so old image data will not add to the new one}
  for line := 1 to xLines do
    begin {zero buffer}
    BlockMove(ptr(BlankLine), dst, BytesPerLine);
    dst := ptr(ord4(dst) + BytesPerLine);
    end;        {refresh dst part finishes} for frame := 0 + FramesToAverage * (k - 1) to (FramesToAverage * k) - 1 do
    begin  {inner loop starts}
    Show2Values(frame + 1, FramesToAverage);   {show the current status in "Values" window}
    BufferReg^ := Frame;           {set the pointer to the appropriate image data location on Scion board} src := srcbase;        {?find the position on Scion board that data starts}
        dst := SumBase;        {find the position to put Sum data}
        myMMUMode := 1;
        SwapMMUMode(myMMUMode);
        for line := 1 to xLines do
          begin
          AddLineToSum(src, dst, xPixelsPerLine);         {at same pixel point,sum all the data on different
images, and put it to dst position }
          src := ptr(ord4(src) + SrcRowBytes);
          dst := ptr(ord4(dst) + BytesPerLine);
          end;
        SwapMMUMode(myMMUMode);
        if CommandPeriod then
          begin
          beep;
          if AutoSelectAll then
            KillRoi
          else
            ShowRoi;
          exit(NPSImagesWithVideoRateCapture);
          end;
    end; {for}
    {inner loop finishes}
    src := SumBase;       {let src points to the sum'd value}
    dst := OffscreenBase;    {let dst points to offscreen base so later on data can be put to the screen}
    DstRowBytes := info^.BytesPerRow;

with info^, info^.StackInfo^ do   {put the averaged result back to the screen}
      begin
      frame := k;
      CurrentSlice := frame;
      SelectSlice(CurrentSlice);
      for line := 0 to xLines - 1 do
        begin
        SumLine := sptr(src);
        FrameLine := LinePtr(dst);
        for j := 0 to xPixelsPerLine - 1 do
          aLine1[j] := SumLine^[j] div FramesToAverage;        {compute the average}
        src := ptr(ord4(src) + BytesPerLine);
        {dst := ptr(ord4(dst) + DstRowBytes);}
```

```
    PutLine(0, line, xPixelsPerLine, aLine1);    { xPixelsPerLine is 640 here !!!}
    SetRect(mask, 0, line, xPixelsPerLine, line + 1);
    UpdateScreen(mask);
    end;
  beep;
  RealToString(k, 1, 1, str1);
  RealToString(1.0 * ScionLG3Values[1 + 8 * (k - 1)].DacA, 1, 1, str2);
  RealToString(1.0 * ScionLG3Values[1 + 8 * (k - 1)].DacB, 1, 1, str3);
  Showmessage(concat('k = ', str1, cr, 'NPS Image Capture settings:', cr, 'DacA =', str2, cr, 'DacB =', str3));
  {Here only show the Dac settings, the setting were changed during video rate capture process, not during
computation}
  end;
end;   {outer loop finishes}
{modification ends}
{above is from procedure AverageFrame}
end;

{---------------->   VectorLineDisplay   <----------------}
procedure VectorLineDisplay;
var
  slices, sRow, slice, i, SaveSlice: integer;
  width, height, hstart, vStart: integer;
  OldInfo, NewInfo: InfoPtr;
  aLine1, aLine2, aLine3, aLine4: LineType;
  mask: rect;
  AutoSelectAll: boolean;
  sum: array[0..MaxWidth] of Real;
  str1: str255;
  h: handle;
  isRoi, update: boolean;
  x, y, arrowlength: integer;
  angle, xinc, yinc: real;
  p1, p2: point;
begin
  OldInfo := Info;
  with info^ do
  begin
    if StackInfo = nil then
    begin
      PutMessage('Calculating azimuth requires a stack.');
      macro := false;
      exit(VectorLineDisplay);
    end;
    AutoSelectAll := not Info^.RoiShowing;
    if AutoSelectAll then
      SelectAll(true);
    with RoiRect do
    begin
      hStart := left;
      vStart := top;
      width := right - left;
      height := bottom - top;
    end;
    if width > MaxWidth then
    begin
      PutMessage(concat('Image can''t average selections wider than ', Long2str(MaxWidth), ' pixels.'));
      macro := false;
```

```
    exit(VectorLineDisplay);
   end;
 with StackInfo^ do
  begin
   slices := StackInfo^.nSlices;
   SaveSlice := CurrentSlice;
  end;
 end;
 with info^, info^.StackInfo^ do
  begin {adding 7th slice}
   if nSlices = MaxSlices then
    exit(VectorLineDisplay);
   isRoi := RoiShowing;
   if isRoi then
    KillRoi;
   h := GetBigHandle(PixMapSize);
   if h = nil then
    begin
     PutMessage('Not enough memory available to add a slice to this stack.');
     macro := false;
     exit(VectorLineDisplay);
    end;
   if nSlices = 4 then
    begin      {adding 5th slice only if there are 4 slices in the stack}
     nSlices := nSlices + 1;
     CurrentSlice := 5;                                              {make current slice be 5}
     PicBaseH[CurrentSlice] := h;
     SelectSlice(CurrentSlice);
     if Update then
      begin
       SelectAll(false);
       DoOperation(EraseOp);
       UpdatePicWindow;
      end;
     UpdateTitleBar;
     if isRoi then
      RestoreRoi;
     WhatToUndo := NothingToUndo;
     changes := true;
     PictureType := NewPicture;
     UpdateWindowsMenuItem(PixMapSize * nSlices, title, PicNum);
    end;
   if nSlices = 5 then
    begin      {adding 6th slice only if there are 5 slices in the stack}
     nSlices := nSlices + 1;
     CurrentSlice := 6;                                              {make current slice be 6}
     PicBaseH[CurrentSlice] := h;
     SelectSlice(CurrentSlice);
     if Update then
      begin
       SelectAll(false);
       DoOperation(EraseOp);
       UpdatePicWindow;
      end;
     UpdateTitleBar;
     if isRoi then
      RestoreRoi;
     WhatToUndo := NothingToUndo;
```

```
changes := true;
PictureType := NewPicture;
UpdateWindowsMenuItem(PixMapSize * nSlices, title, PicNum);
end;
end;{of adding 6th slice} with info^, info^.StackInfo^ do
begin    {adding 7th slice}
if nSlices = MaxSlices then
 exit(VectorLineDisplay);
isRoi := RoiShowing;
if isRoi then
 KillRoi;
h := GetBigHandle(PixMapSize);
if h = nil then
 begin
 PutMessage('Not enough memory available to add a slice to this stack.');
 macro := false;
 exit(VectorLineDisplay);
 end;
if nSlices = 6 then{add a new slice only if nslice = 6}
 begin
 nSlices := 7;
 CurrentSlice := 7;                              {make current slice be 7}
 PicBaseH[CurrentSlice] := h;
 SelectSlice(CurrentSlice);
 if Update then
  begin
  SelectAll(false);
  DoOperation(EraseOp);
  UpdatePicWindow;
  end;
 UpdateTitleBar;
 if isRoi then
  RestoreRoi;
 WhatToUndo := NothingToUndo;
 changes := true;
 PictureType := NewPicture;
 UpdateWindowsMenuItem(PixMapSize * nSlices, title, PicNum);
 end;
end;       {of adding 7th slice}
{of adding 3 slices}
{get vector value and plot it:} with info^, info^.StackInfo^ do
begin
angle := 30;
arrowlength := 20;
for sRow := vStart to vStart + height - 1 do
 begin
 for i := 0 to width - 1 do
  begin
  angle := (angle / 180.0) * pi;
  xinc := cos(angle);
  yinc := -sin(angle);
  x := i + round(arrowlength * xinc);
  y := sRow + round(arrowlength * yinc);
  end;
```

```
  SelectSlice(7);           {activate vectorplot window}
{ShowWindow(CurrentWPtr);}
{SetPort(CurrentWPtr);}
  KillRoi;                  {obtained from procedure DoLineTo from Macros1.p}
  p1.h := 10;
  p1.v := 100;
  p2.h := 50;
  p2.v := 150;
{CurrentX := p2.h;}
{CurrentY := p2.v;}
  OffscreenToScreen(p1);
  OffscreenToScreen(p2);
  DrawObject(LineObj, p1, p2);
{MoveTo(10, 100);}
{LineTo(15, 105);}
{SetRect(mask, 0, 0, width, 200);}
{UpdateScreen(mask);}
  if CommandPeriod then
    leave;
  end;      {finish the azimuth calculation process}
end;
{Restoreroi;}
{SetupRoiRect;}
beep;   {finish the azimuth calculation process}
info := OldInfo;
if AutoSelectAll then
  KillRoi;
end;

procedure DoUserMenuEvent (MenuItem: integer);
begin
case MenuItem of
1:
 Retauto;
2:
 Retmanualconversion;
3:
 Azimuthauto;
4:
 Retandazimuth;
5:
 AlphaAndBetaMinBackground;
6:
 RetautoWithBackgroundCorrection;
7:
 RetManualWithBackgroundCorrection;
8:
 AzimuthautoWithBackgroundCorrection;
9:
 ConvertResultToSonyVideoPrinterHSV;
10:
 ConvertResultToEightBitColor;
11:
 ConvertHSVToRGB;
end;
end;
```

```
procedure UserMacroCode (str: str255; Param1, Param2, Param3: extended);
begin
MakeLowerCase(str);
if pos('retauto', str) <> 0 then
 begin    {string needs to be at lower case!}
 Retauto;
 exit(UserMacroCode);
 end;
if pos('retmanualconversion', str) <> 0 then
 begin
 Retmanualconversion;
 exit(UserMacroCode);
 end;
if pos('azimuthauto', str) <> 0 then
 begin
 Azimuthauto;
 exit(UserMacroCode);
 end;
if pos('retandazimuth', str) <> 0 then
 begin
 Retandazimuth;
 exit(UserMacroCode);
 end;
if pos('inputretconversionfactor', str) <> 0 then
 begin
 inputretconversionfactor(Param1);
 exit(UserMacroCode);
 end;
if pos('quickanddirtyaverage', str) <> 0 then
 begin
 QuickAndDirtyAverage(Param1);
 exit(UserMacroCode);
 end;
if pos('timescan', str) <> 0 then
 begin
 TimeScan(Param1, Param2, Param3);
 exit(UserMacroCode);
 end;
if pos('alphaandbetaminbackground', str) <> 0 then
 begin
 AlphaAndBetaMinBackground;
 exit(UserMacroCode);
 end;
if pos('retautowithbackgroundcorrection', str) <> 0 then
 begin
 RetautoWithBackgroundCorrection;
 exit(UserMacroCode);
 end;
if pos('retmanualwithbackgroundcorrection', str) <> 0 then
 begin
 RetManualWithBackgroundCorrection;
 exit(UserMacroCode);
 end;
if pos('azimuthautowithbackgroundcorrection', str) <> 0 then
 begin
 AzimuthautoWithBackgroundCorrection;
 exit(UserMacroCode);
```

```
 end;
if pos('npsimageswithvideoratecapture', str) <> 0 then
begin
NPSImagesWithVideoRateCapture;
exit(UserMacroCode);
 end;
end;

end.
```

What is claimed is:

1. A method for determining polarization properties of light from an object, said method comprising the steps of:
   providing a detector for detecting the intensity of light incident thereon;
   providing an optical path extending from the object to said detector;
   providing in said optical path a pair of variable light retarders positioned such that light from said object that is incident on said detector has passed through both of said retarders in said path, said light retarders being positioned such that the slow optical axes thereof are at a 45° angle to each other;
   providing a polarized light analyzer in said optical path between said light retarders and said detector;
   for each of said light retarders, determining a base retardance level such that when each of said light retarders is set at said base retardance thereof and light from a said object is circularly polarized, said light analyzer will cause substantial extinction of light from said object that traverses said analyzer and the intensity of light from said object incident on said detector will be substantially zero, and
   setting the retardance of said light retarders at a first retardance level in which the retardance of at least one of said retarders is different from the base retardance thereof;
   determining the intensity of light incident on said detector when said light retarders are set at said first retardance level;
   setting the retardance of each of said light retarders at a second retardance level in which the retardance of at least one of said retarders is different from the retardance of said retarders when said retarders are set at said first retardance level;
   determining the intensity of light incident on said detector when said light retarders are set at said second retardance level; and
   determining polarization properties of said light from the object on the basis of said intensities at said first and second retardance levels.

2. The process of claim 1 including the steps of illuminating said object with elliptically polarized light for determining said intensity when said light retarders are set at one of said retardance levels and of illuminating said object with circularly polarized light when said light retarders are set at another of said retardance levels.

3. The process of claim 1 wherein said second retardance level is said base retardance level.

4. The process of claim 1 including the steps of setting the retardances of said light retarders at a total of not less than four different retardance levels, determining the intensity of light incident on said detector at each of said four retardance levels, and determining said polarization properties of said light from the object on the basis of said intensities at said four retardance levels, said first and second retardance levels being two of said four retardance levels.

5. The process of claim 4 wherein one of said four retardance levels is said base retardance level.

6. The process of claim 4 including the steps of illuminating said object with elliptically polarized light for determining said intensity when said light retarders are set at three of said four retardance levels and of illuminating said object with circularly polarized light when said light retarders are set at the other of said retardance levels.

7. A system for determining optical properties of an object and comprising
   a source of monochromatic, polarized light;
   a detector for detecting the intensity of light incident thereon,
   an optical path extending from said source to said detector,
   a pair of variable light retarders mounted in said optical path such that light from said object that is incident on said detector has passed through both of said retarders in said path,
   a controller for varying the retardance of each of said variable light retarders thereby to vary the extent to which each of said retarders varies the polarization state of light passing therethrough,
   a polarized light analyzer mounted in said path between said light retarders and said detector, and
   a support for mounting an object whose optical characteristics are to be measured in said optical path between said polarized light analyzer and at least one of said variable retarders,
   said system being characterized in that:
      said light retarders are mounted with their slow axes at 450 to each other;
      said light analyzer and said light retarders are such that when the retardance of each of said light retarders is set at a respective first retardance level and light from a said object mounted on said support is circularly polarized, said light analyzer causes substantial extinction of light from said object that traverses said analyzer and the intensity of light from said object incident on said detector is substantially zero,
      said controller is arranged to vary the retardance of each of said retarders to vary the polarization state of light that has passed through both of said retarder, and
      said detector is arranged to measure the intensity of light incident thereon when said retarders are set at each of a plurality of different retardance levels and to determine optical characteristics of an object in said optical path on the basis of said measured intensity at each of said plurality of retardance levels.

8. The system of claim 7 further characterized in that light emitted from said source is circularly polarized or near-circular polarized in said optical path before illuminating a said object in said optical path and during measurement of said intensity by said detector.

9. The system of claim 7 further characterized in that at least one of said variable retarders is mounted between said support and said source and the retardance of said at least one variable retarder is approximately that of a quarter wave plate so as to circularly polarize or near-circularly polarize linearly polarized light from said source that passes through said at least one variable retarder during measurement of said intensity.

10. The system of claim 9 further characterized in that one of said variable retarders is mounted on each side of said support, and the retardance of each of said variable retarders is approximately that of a quarter-wave plate during measurement of said intensity.

11. A system for determining optical properties of an object and comprising
   a source of monochromatic, polarized light;
   a detector for detecting the intensity of light incident thereon, an optical path extending from said source to said detector, a pair of variable light retarders mounted in said optical path such that light from said object that is incident on said detector has passed through both of said retarders in said path, a controller for varying the retardance of each of said variable light retarders thereby to vary the extent to which each of said retarders varies the polarization state of light passing therethrough, a polarized light analyzer mounted in said path between said light retarders and said detector, and a support for mounting an object whose optical characteristics are to be measured in said optical path between said polarized light analyzer and at least one of said variable retarders, said system being characterized in that:

said light retarders are mounted in said optical path on the same side of said support with their slow axes at 45° to each other;

said light analyzer and said light retarders are such that when the retardance of each of said light retarders is set at a respective first retardance level and light from a said object mounted on said support is circularly polarized, said light analyzer causes substantial extinction of light from said object that traverses said analyzer and the intensity of light from said object incident on said detector is substantially zero, said controller is arranged to vary the retardance of each of said retarders to vary the polarization state of light that has passed through both of said retarder, and said detector is arranged to measure the intensity of light incident thereon when said retarders are set at each of a plurality of different retardance levels and to determine optical characteristics of an object in said optical path on the basis of said measured intensity at each of said plurality of retardance levels.

12. The system of claim 11 further characterized in that said pair of variable retarders is mounted between said support and said analyzer.

13. The system of claim 11 further characterized in that said pair of variable retarders is mounted between said source and said support.

\* \* \* \* \*